US012677207B2

(12) United States Patent
Lalwala et al.

(10) Patent No.: US 12,677,207 B2
(45) Date of Patent: Jul. 7, 2026

(54) SUPPORTING MULTIPLE RADIO UNITS ON A SINGLE DISTRIBUTED UNIT

(71) Applicant: Rakuten Symphony, Inc., Tokyo (JP)

(72) Inventors: Ronak Lalwala, Bangalore (IN); Siddhant Gupta, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 518 days.

(21) Appl. No.: 18/010,065

(22) PCT Filed: Nov. 25, 2022

(86) PCT No.: PCT/US2022/051000
§ 371 (c)(1),
(2) Date: Dec. 13, 2022

(87) PCT Pub. No.: WO2024/112342
PCT Pub. Date: May 30, 2024

(65) Prior Publication Data
US 2024/0251329 A1      Jul. 25, 2024

(51) Int. Cl.
*H04W 48/08* (2009.01)
*H04W 72/0453* (2023.01)
*H04W 88/08* (2009.01)

(52) U.S. Cl.
CPC ....... *H04W 48/08* (2013.01); *H04W 72/0453* (2013.01); *H04W 88/085* (2013.01)

(58) Field of Classification Search
CPC ................................. H04B 1/38; H04W 48/08
See application file for complete search history.

(56) References Cited

U.S. PATENT DOCUMENTS

| | | | |
|---|---|---|---|
| 2018/0343577 A1 * | 11/2018 | Takiguchi | H04W 72/542 |
| 2020/0396728 A1 * | 12/2020 | Zhu | H04W 72/23 |
| 2021/0243797 A1 * | 8/2021 | Reddy | H04L 27/2671 |
| 2021/0385686 A1 * | 12/2021 | Ahmed | H04W 28/06 |
| 2022/0095160 A1 * | 3/2022 | Thelen | H04L 1/08 |

(Continued)

FOREIGN PATENT DOCUMENTS

WO      2021/112747 A1      6/2021

OTHER PUBLICATIONS

International Search Report and Written Opinion for International Patent Application No. PCT/US22/51000 mailed Mar. 27, 2023.

(Continued)

*Primary Examiner* — Fabricio R Murillo Garcia
(74) *Attorney, Agent, or Firm* — Sughrue Mion, PLLC

(57) ABSTRACT

In general, the current subject matter relates to supporting multiple radio units (RUS) on a single distributed unit (DU). In some implementations, supporting multiple RUs on a single DU can include receiving, by a DU in an open radio access network from an RU in the open radio access network, an identifier that identifies the RU; identifying, by the DU, communication information associated with the RU based on the identifier that identifies the RU; determining, by the DU, a communication feature related to data transmission to the RU using a particular carrier of the DU; and transmitting data from the DU to the RU, using the particular carrier, in accordance with the communication information and the communication feature.

19 Claims, 23 Drawing Sheets

(56) References Cited

U.S. PATENT DOCUMENTS

| | | | | |
|---|---|---|---|---|
| 2023/0108782 A1* | 4/2023 | Kang | ................. | H04W 88/085 |
| | | | | 370/336 |
| 2023/0422284 A1* | 12/2023 | Akl | .................... | H04B 17/309 |

OTHER PUBLICATIONS

O-RAN Working Group 4 (Open Fronthaul Interfaces WG), "Control, User and Synchronization Plane Specification," v10.00, Jul. 23, 2022.
O-RAN Alliance, "O-RAN WG1 Operations and Maintenance Architecture v02.00", O-RAN-WG1.OAM-Architecture-v02.00, 2019 (37 pages).
O-RAN Alliance Working Group 4, "O-RAN Alliance Working Group 4 Management Plane Specification", ORAN-WG4.MP.0-v01. 00, 2019 (125 pages).

\* cited by examiner

900

Perform initial handshake between ODU and ORU with ODU receiving ORU ID from ORU    902

ODU looks up communication information based on ORU ID    904

For each carrier ODU determines communication feature related to data transmission to ORU    906

ODU transmits data to ORU in accordance with communication feature    908

1200

Perform initial handshake between ODU and ORU with ODU receiving ORU ID from ORU 〜1202

Look up IOT profile based on ORU ID to identify eAxC_ID profile for ORU 〜1204

Transmit IOT profile to ODU Layer 1 〜1206

Modify DU_Port_ID with absolute carrier number from eAxC_ID profile 〜1208

Perform CP and UP transmissions from ODU to ORU via fronthaul network 〜1210

1400

Perform initial handshake between ODU and ORU with ODU receiving ORU ID from ORU — 1402

Form beam profile and assign ORU deployment ID — 1404

Transmit beam profile and ORU deployment ID to ODU Layer 1 — 1406

Determine beamforming weights based on beam profile and ORU deployment ID — 1408

Transmit beamforming weights from ODU to ORU via fronthaul network — 1410

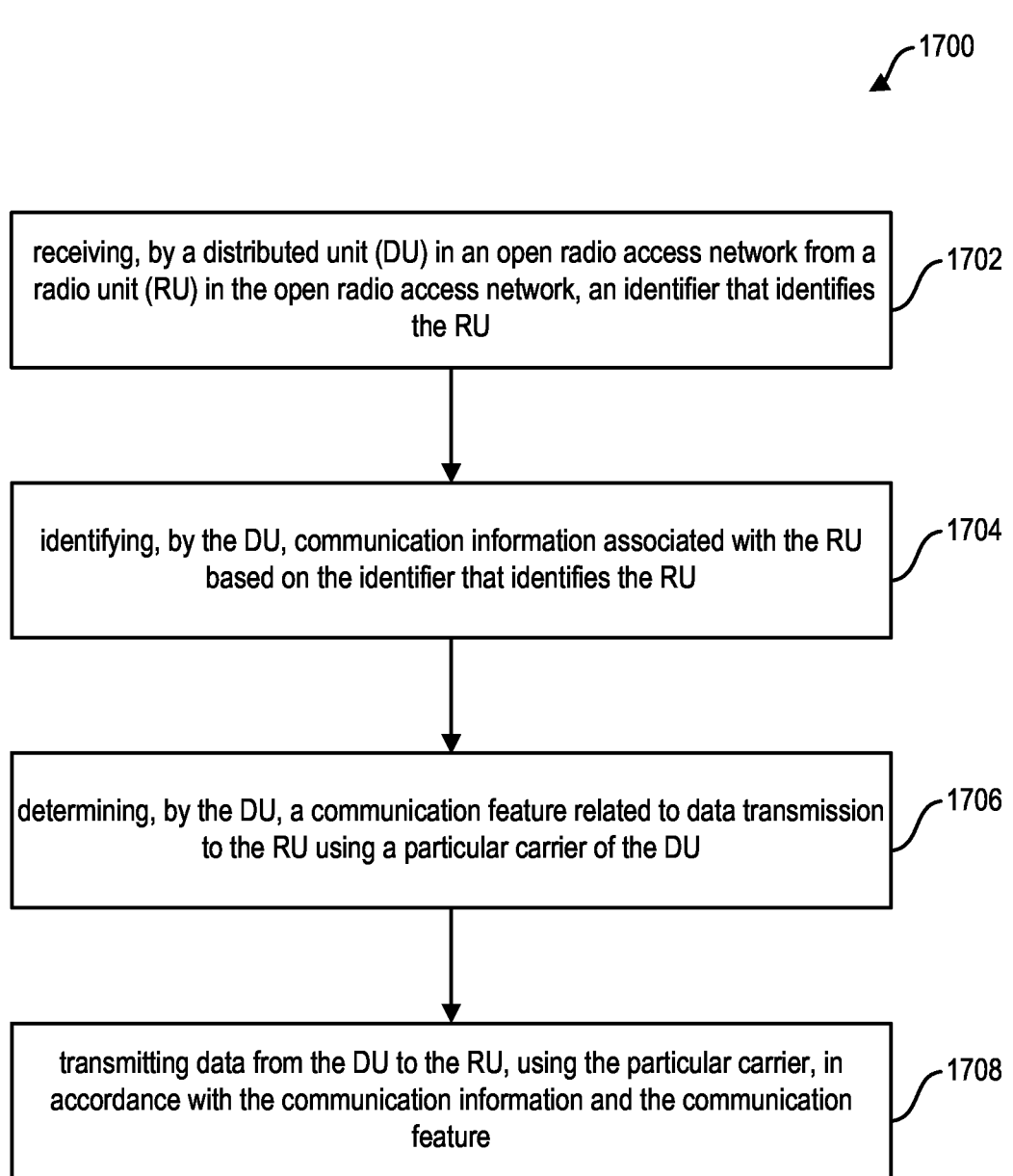

1700 receiving, by a distributed unit (DU) in an open radio access network from a radio unit (RU) in the open radio access network, an identifier that identifies the RU — 1702 identifying, by the DU, communication information associated with the RU based on the identifier that identifies the RU — 1704 determining, by the DU, a communication feature related to data transmission to the RU using a particular carrier of the DU — 1706 transmitting data from the DU to the RU, using the particular carrier, in accordance with the communication information and the communication feature — 1708

FIG. 17.

SUPPORTING MULTIPLE RADIO UNITS ON A SINGLE DISTRIBUTED UNIT

TECHNICAL FIELD

In some implementations, the current subject matter relates to telecommunications systems, and in particular, to supporting multiple radio units (RUS) on a single distributed unit (DU).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

In an open radio access network (open RAN), communications via the fronthaul network can be synchronized in time and frequency by synchronizing clocks of distributed units (O-DUs) and radio units (O-RUs) that communicate via the fronthaul network. The synchronization can allow messages communicated via the fronthaul network to be sent and received properly and within predefined time windows for such messages. However, conventional O-DUs cannot support multiple O-RUs as there are no methods defined as part of the currently available standard specifications by the Open RAN (O-RAN) Alliance or 3GPP which allow a single O-DU to support multiple O-RUs each having varied fronthaul message requirements.

SUMMARY

In some implementations, the current subject matter relates to a computer-implemented method. The method can include receiving, by a distributed unit (DU) in an open radio access network from a radio unit (RU) in the open radio access network, an identifier that identifies the RU. The method can also include identifying, by the DU, communication information associated with the RU based on the identifier that identifies the RU, determining, by the DU, a communication feature related to data transmission to the RU using a particular carrier of the DU, and transmitting data from the DU to the RU, using the particular carrier, in accordance with the communication information and the communication feature.

The method may allow the DU to support multiple RUs in the open radio access network.

In some implementations, the current subject matter can include one or more of the following optional features.

In some implementations, the communication information can include an interopability (IOT) profile, and the communication feature can include a delay window for data transmission. Further, the identifying can include looking the identifier up in a lookup table stored in the at least one non-transitory storage media, and the lookup table can uniquely associate each of a plurality of RU identifiers with an IOT profile; and/or the data can be transmitted via a fronthaul network and can include control plane (C-plane) data and user plane (U-plane) data.

In some implementations, the communication information can include an extended antenna carrier identifier (eAx-C_ID) that includes a DU PORT ID, and determining the communication feature can include modifying the DU PORT ID. Further, the data can be transmitted via a fronthaul network and can include U-plane data. Further, the method can also include transmitting, from the DU to the RU, the modified DU PORT ID on the U-plane, and the RU can be configured to loop the received modified DU PORT ID to a C-plane.

In some implementations, identifying the communication information can include forming a beamforming profile and assigning a deployment ID to the RU, and the communication feature can include beamforming weights. Further, transmitting the data can include transmitting the beamforming weights from the DU to the RU, and/or determining the communication feature can include identifying which beamforming weights of a plurality of predefined beamforming weights correlate to the assigned deployment ID.

In some implementations, the method can also include transmitting the identified communication information from layer 3 of the DU to layer 1 of the DU, and layer 1 of the DU can perform the determining.

In some implementations, the DU can receive the identifier from the RU in an initial handshake process between the DU and the RU.

In some implementations, the DU can be a single DU: the method can also include receiving, by the DU from a second RU in the open radio access network, an identifier that identifies the second RU: the method can also include identifying, by the DU, communication information associated with the second RU based on the identifier that identifies the second RU: the method can also include determining, by the DU, a communication feature related to data transmission to the second RU using a second particular carrier of the DU; and the method can also include transmitting data from the DU to the second RU, using the second particular carrier, in accordance with the communication information associated with the second RU and the communication feature related to data transmission to the second RU.

In some implementations, a base station can include at least one processor and at least one non-transitory storage media storing instructions that, when executed by the at least one processor, cause the at least one processor to perform operations: the base station can be configured to communicate in a wireless communications network, and the operations can include the method. Further, the base station can includes an eNodeB or a gNodeB.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a:

FIG. 1c illustrates additional detail of the evolved packet core of the exemplary LTE system shown in FIG. 1a:

FIG. 1d illustrates an exemplary evolved Node B of the exemplary LTE system shown in FIG. 1a:

FIG. 8b illustrates a second portion of the example time transmission window of FIG. 8a:

FIG. 17 illustrates an exemplary method, according to some implementations of the current subject matter.

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to supporting multiple radio units (RUs) on a single distributed unit (DU).

In some implementations of the current subject matter, a DU in an open radio access network ("open RAN" or "ORAN") can be configured to support multiple RUs in the open RAN. Thus, fewer DUs may need to be deployed to support multiple RUs, which may reduce cost. Conventional DUs in an open radio access network cannot support multiple RUs in the open radio access network as there are no methods defined as part of the currently available standard specifications by the O-RAN Alliance which allow a single DU to support multiple RUs each having varied fronthaul message requirements.

Standards of the O-RAN Alliance defining one or more aspects that may be related to the current subject matter include O-RAN Working Group (WG) 4 (Open Fronthaul Interfaces WG) "Control, User and Synchronization Plane Specification." 3GPP standards may also be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
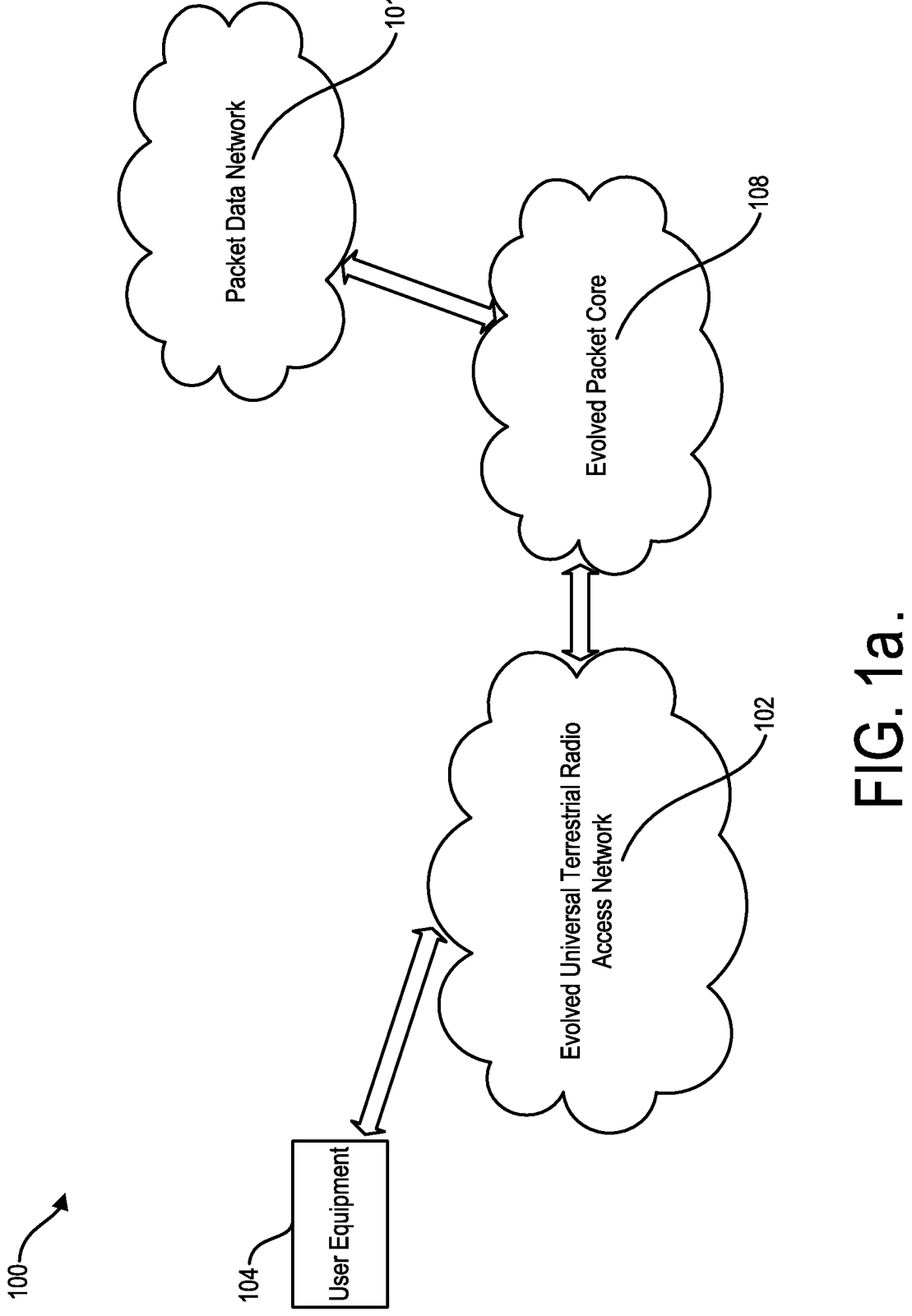
FIG. 1a illustrates an exemplary conventional long term evolution ("LTE") communications system.
Figure 1B:
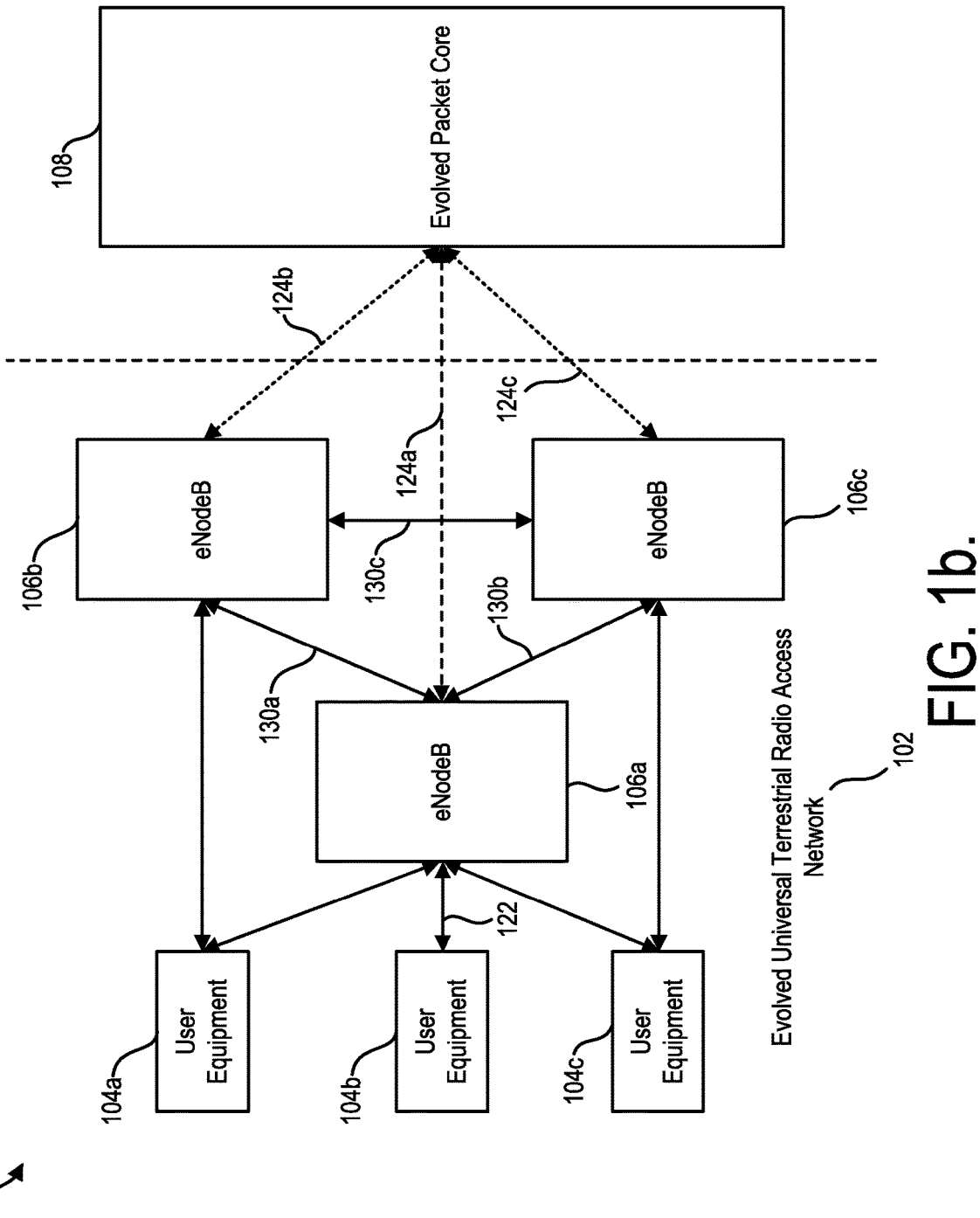

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106(a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
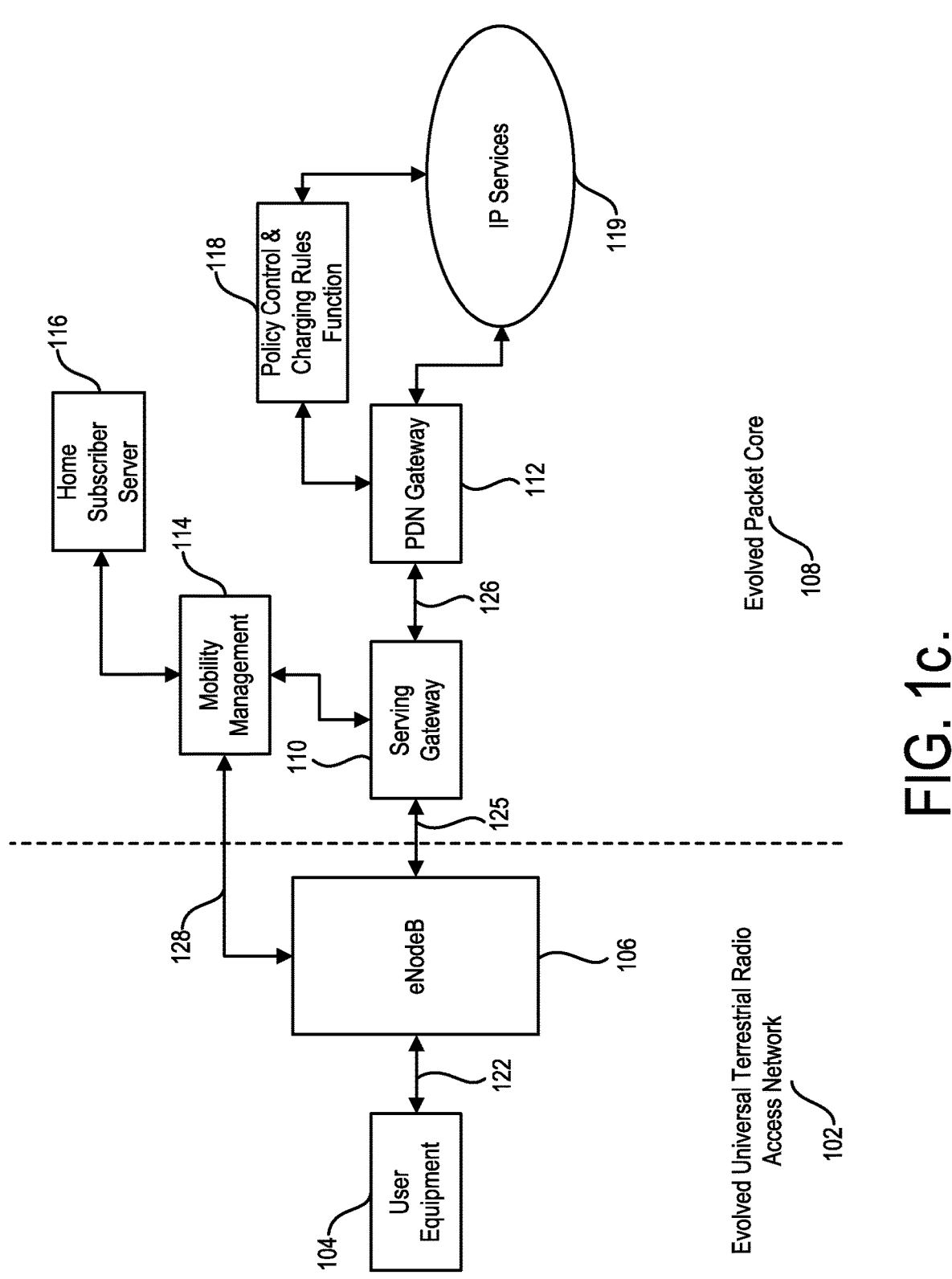

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
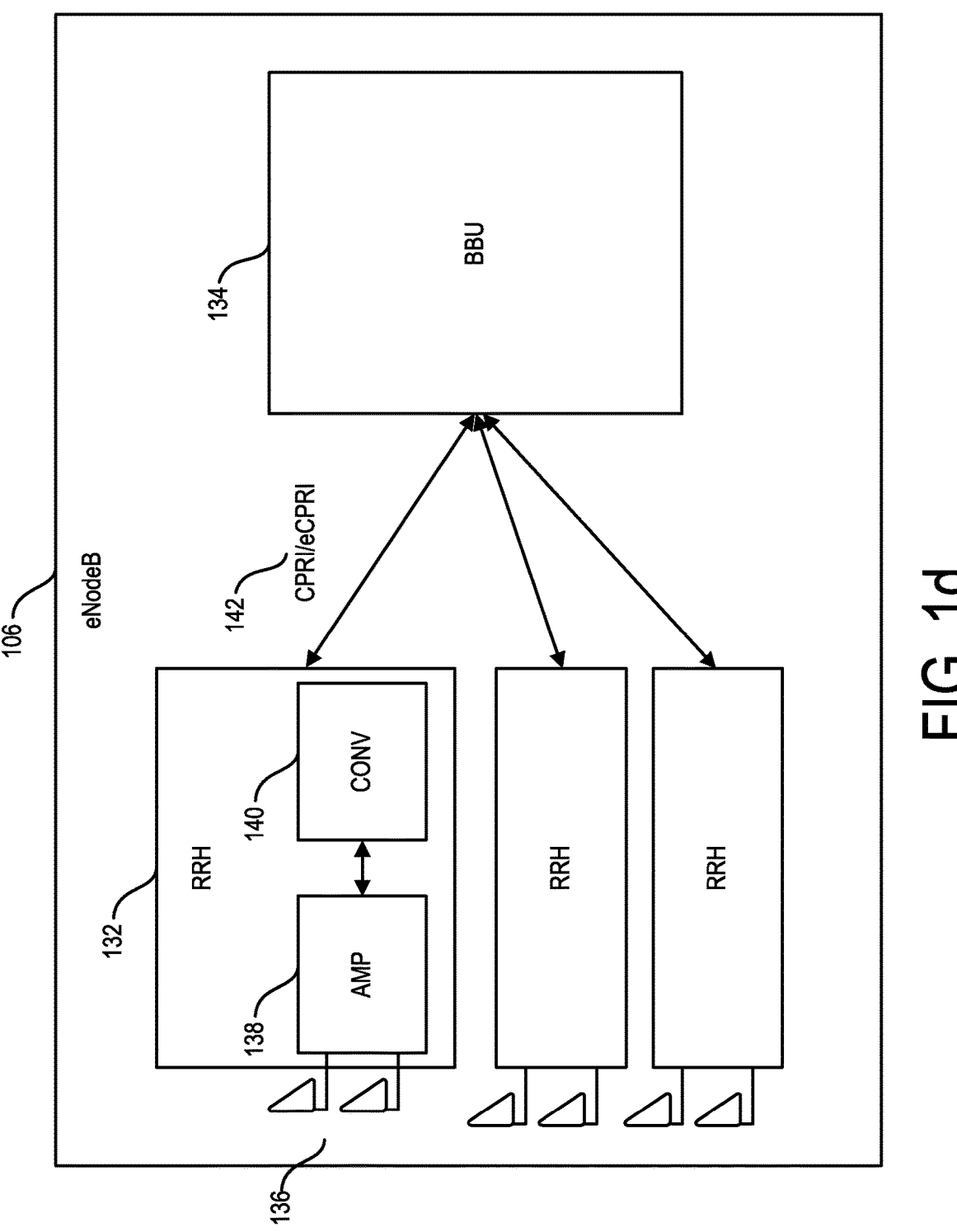

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
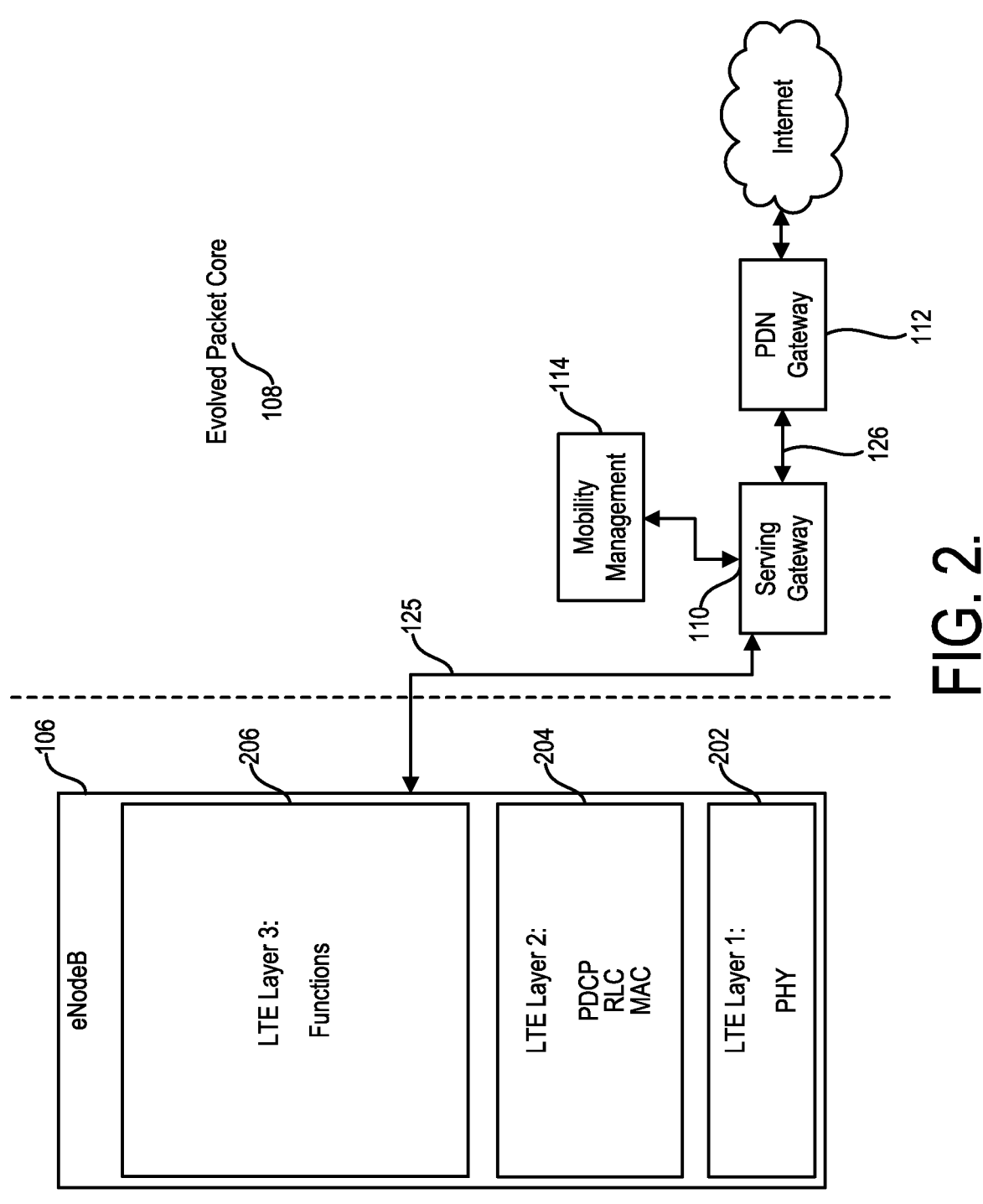
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeB 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
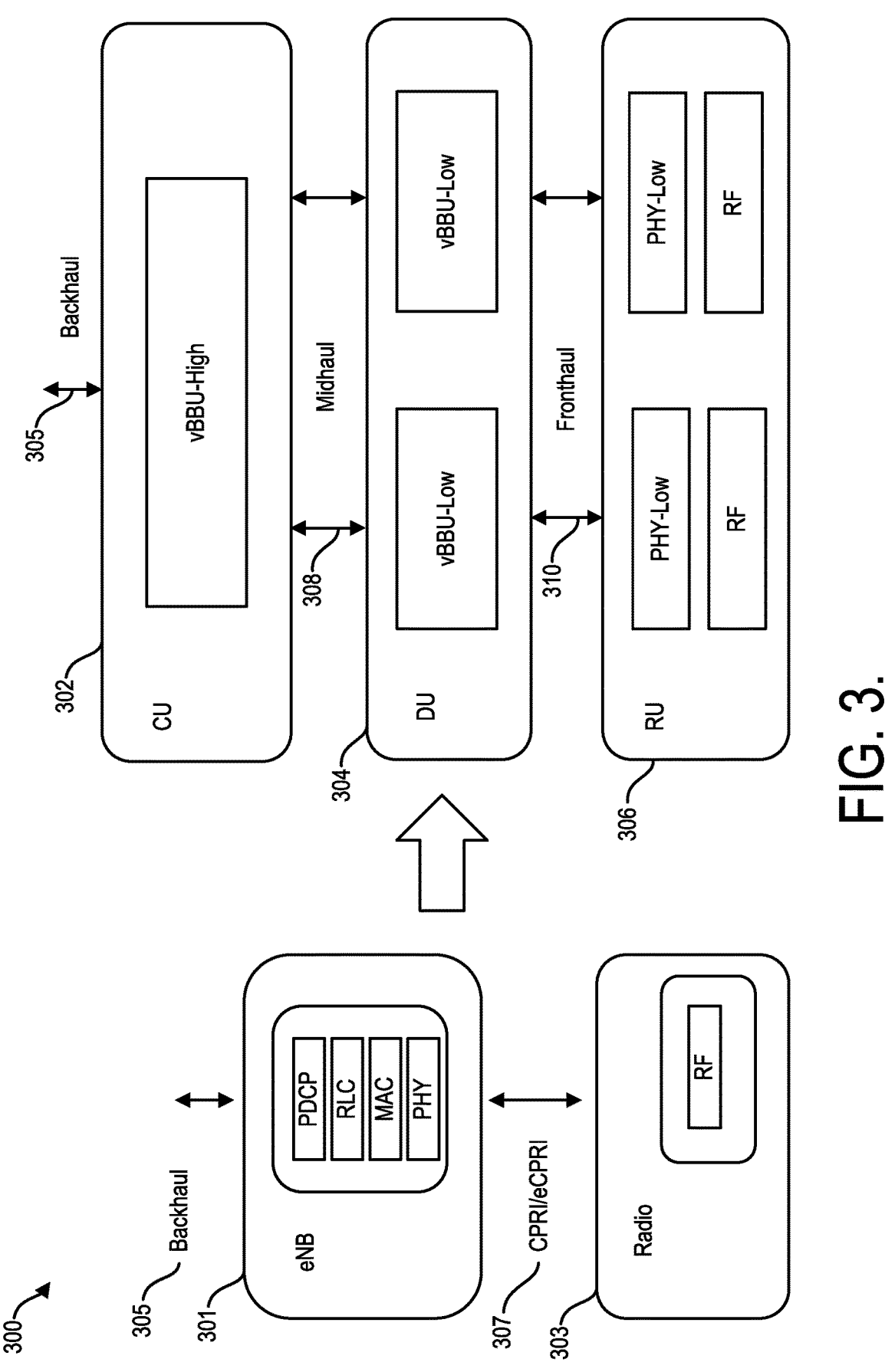
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
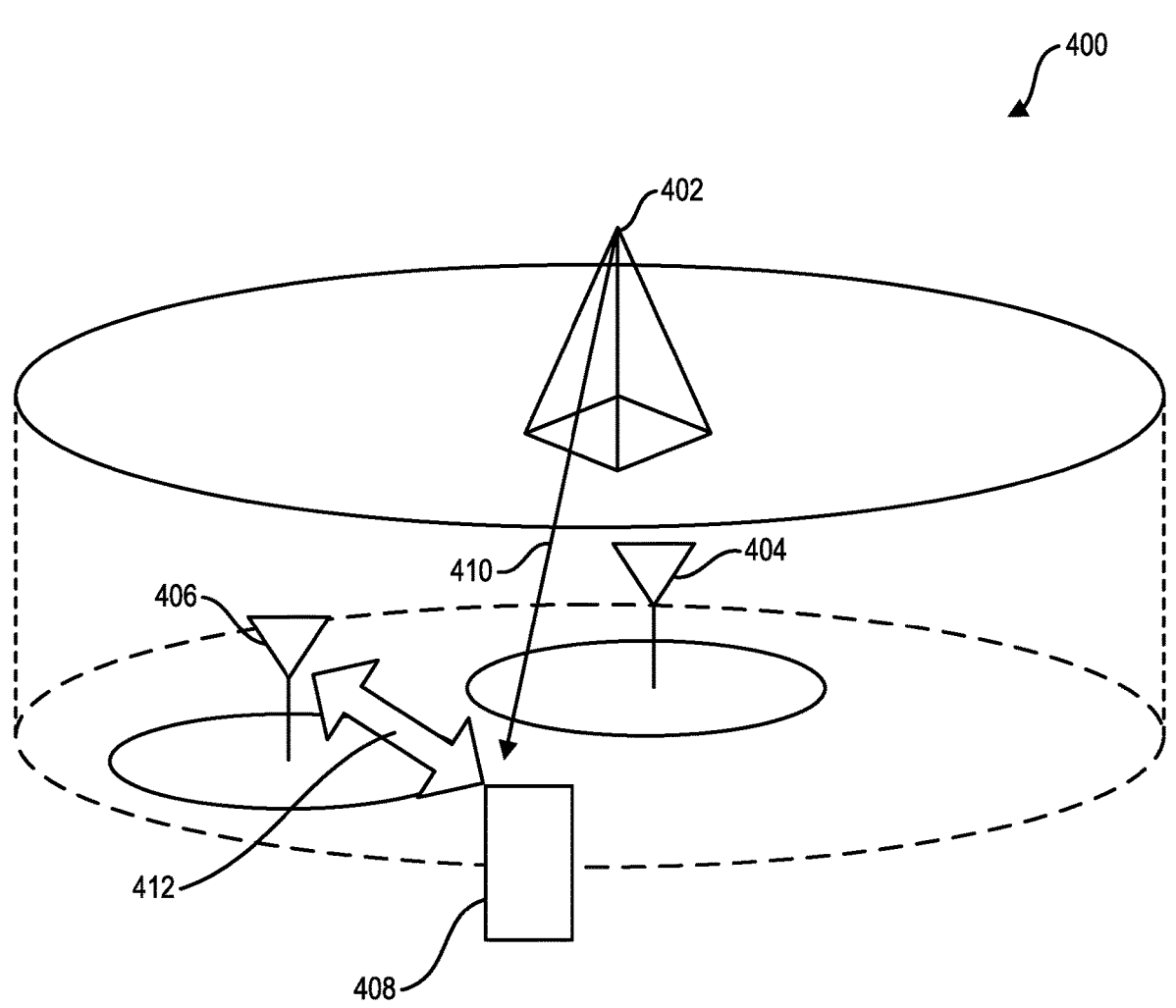
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
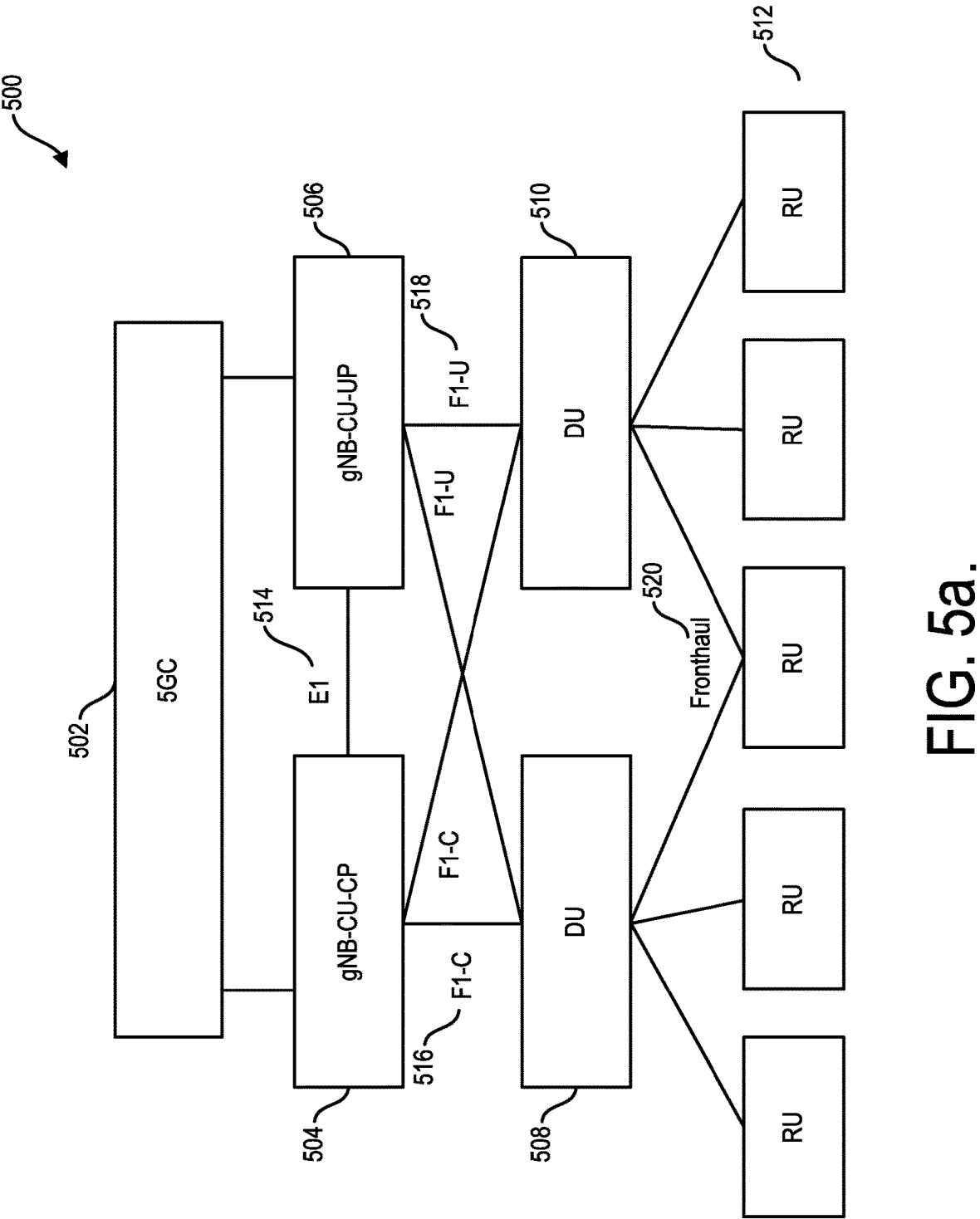
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
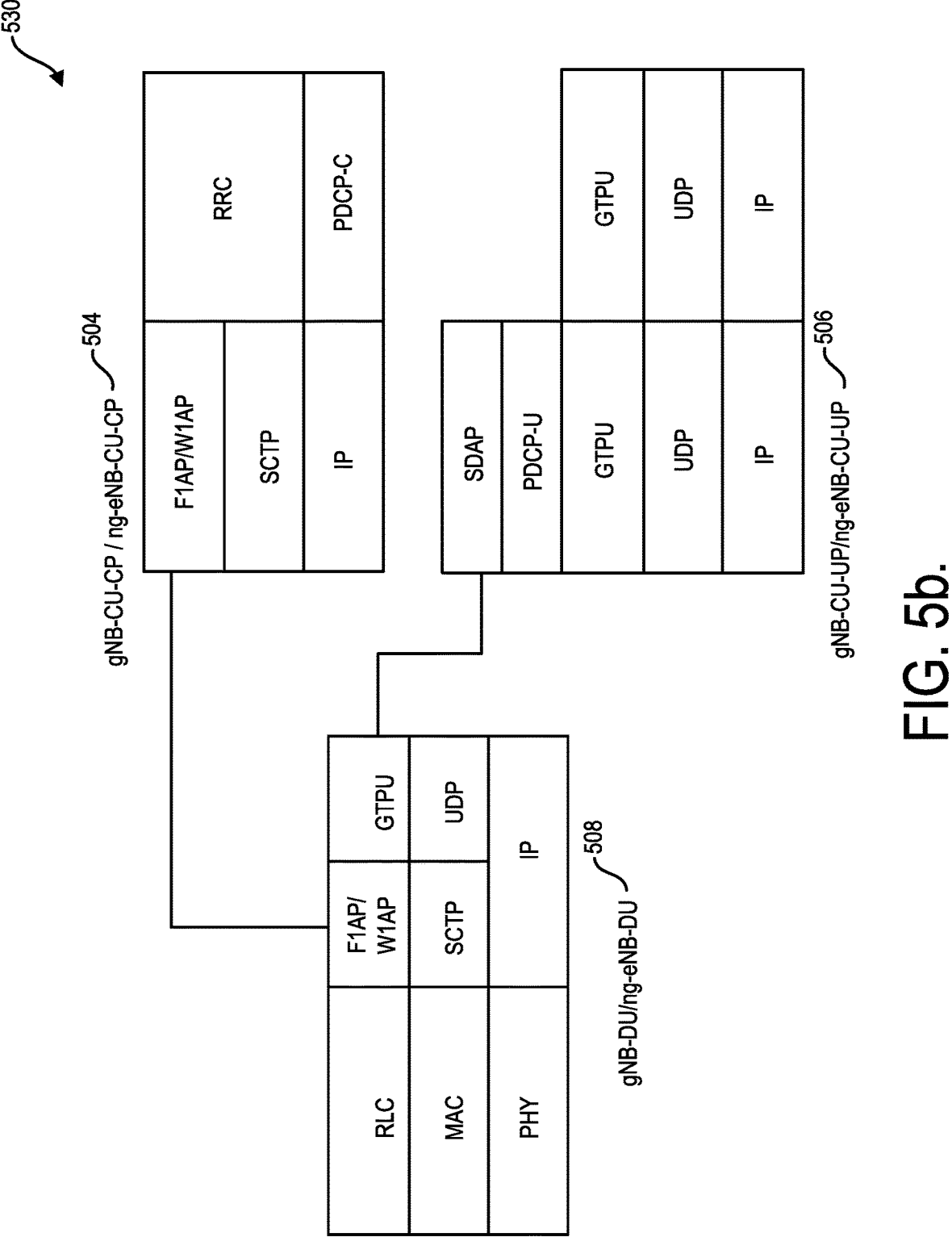
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
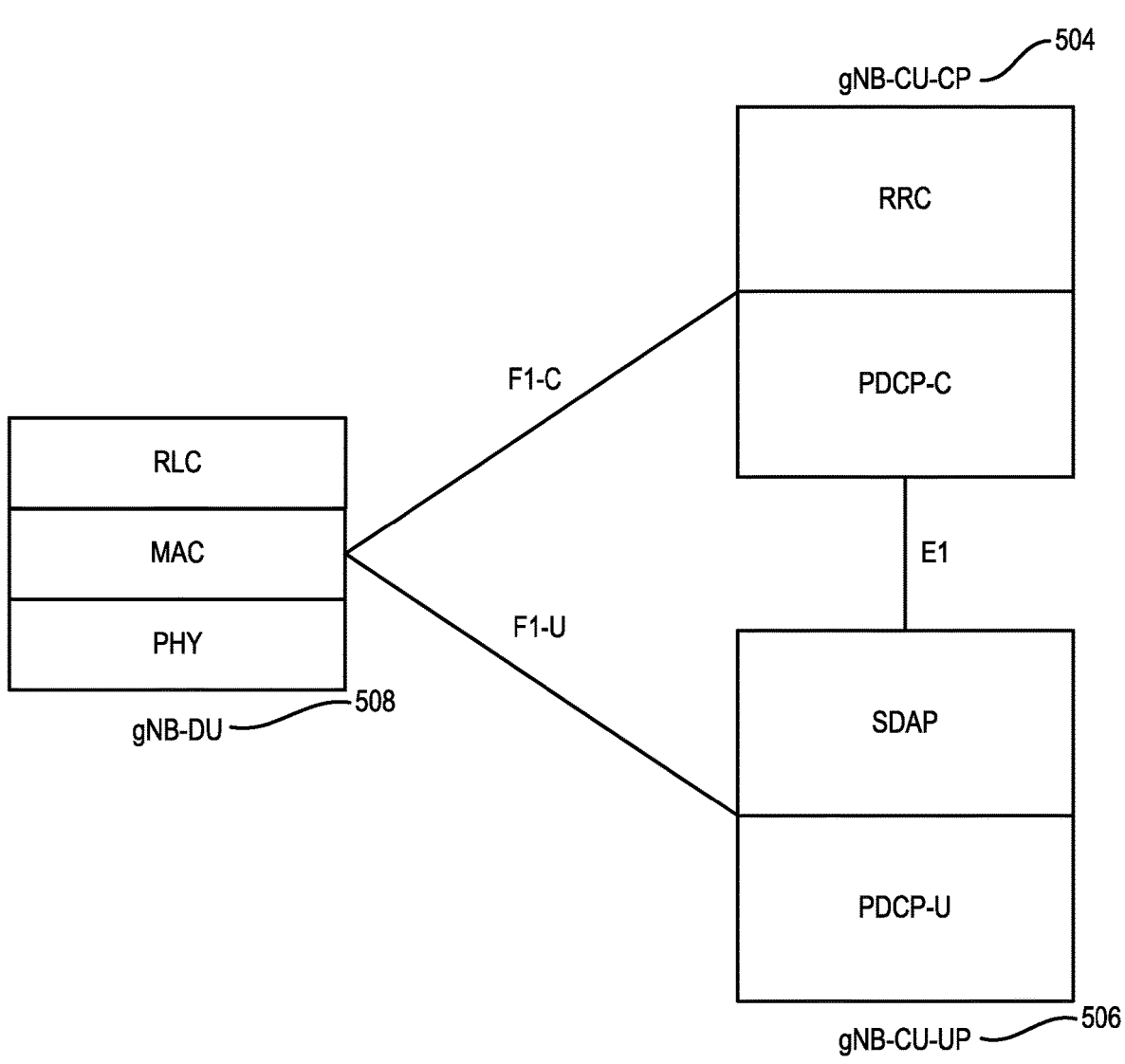
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Supporting Multiple Radio Units on a Single Distributed Unit

In some implementations of the current subject matter, a DU in an open RAN can be configured to support multiple RUs in the open RAN. The DU can include a plurality of carriers, each of which can have a configuration customized to a particular one of the RUs. The DU can therefore be able to support multiple RUs even though one or more of the RUs may have different fronthaul message requirements than one or more of the other RUs.

Figure 6:
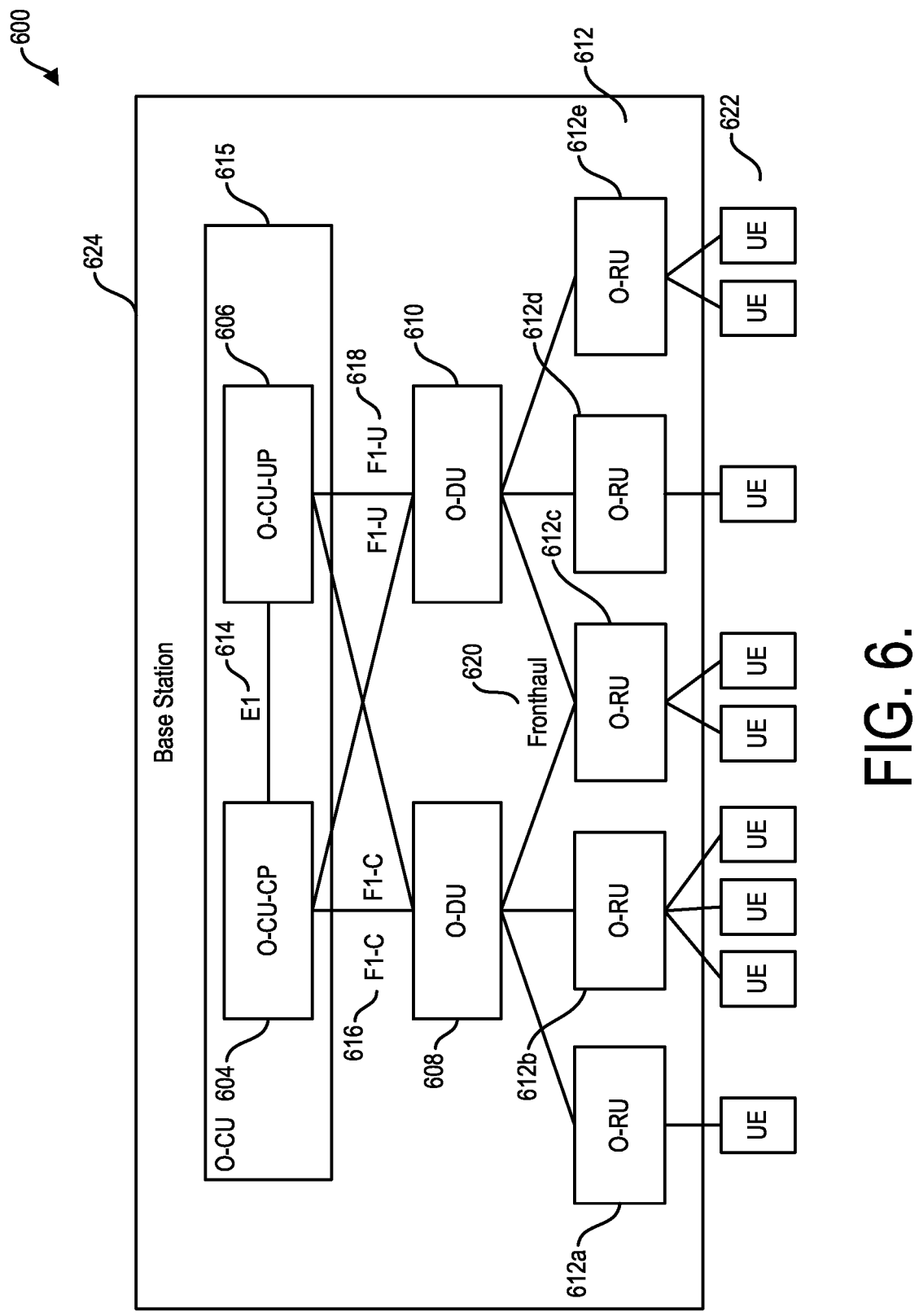
FIG. 6 illustrates an exemplary system including open radio access network components.

FIG. 6 illustrates an exemplary system 600 configured to allow support of multiple RUs on a single DU. The system 600 includes a base station 624, e.g., an eNodeB (e.g., eNB 106 of FIGS. 1b-2, eNB 301 of FIG. 3, etc.) configured to be in an LTE wireless communication system, a gNodeB (e.g., gNB of FIG. 5a, etc.) configured to be in a 5G wireless communication system, a base station configured to be in a 6G or later generation wireless communication system, etc. In the illustrated implementation of FIG. 6, the system 600 implements an open RAN architecture. The base station 624 thus includes an O-RAN compliant CU (O-CU or OCU) 615 including an O-RAN compliant CU-CP (O-CU-CP or OCUCP) 604 and an O-RAN compliant CU-UP (O-CU-UP or OCUCP) 606. The O-CU-CP 604 is configured to be communicatively coupled to the O-CU-UP 606 using an E1 communication interface 614. The O-CU 615 is configured to be communicatively coupled with a core network (not shown in FIG. 6), e.g., EPC 108 of FIGS. 1a-1c and 2, 5GC 502 of FIG. 5a, etc.

The base station 624 also includes a plurality of O-RAN compliant DUs (O-DUs or ODUs) 608, 610. The base station 624 includes two O-DUs 608, 610 in this illustrated implementation but can include another plural number of O-DUs. The O-CU-CP 604 is configured to be communicatively coupled to the O-DUs 608, 610 using F1-C communication interfaces 616. The O-CU-UP 606 is configured to be communicatively coupled to the O-DUs 608, 610 using F1-U communication interfaces 618. Each of the O-DUs 608, 610 is configured to support two or more O-RUs 612, as described herein. In other implementations, not all of a base station's O-DUs may be configured to configured to support two or more O-RUS.

The base station 624 also includes a plurality of O-RAN compliant RUs (O-RUs or ORUs) 612a, 612b, 612c, 612d, 612e, collectively referred to as O-RUs 612. The base station 624 includes five O-RUs 612 in this illustrated implementation but can include another plural number of O-RUs 612. The O-RUs 612 are configured to be communicatively coupled to the O-DUs 608, 610 via a fronthaul network 620. Additionally, each of the O-RUs 612 is configured to be communicatively coupled to one or more UEs 622. In this illustrated implementation, first and fourth ones of the RUs 612a, 612d are shown communicatively coupled to one UE 622, second and fifth ones of the O-RUs 612b, 612e are shown communicatively coupled to two UEs 622, and a second one of the O-RUs 612b is shown communicatively coupled to three UEs 622. However, each of the O-RUs 612 can be coupled to another number of UEs same or different from any of the other O-RUs 612.

Examples of UEs that may be used as any one or more of the UEs 622 include mobile telephones, smartphones, tablets, personal computers, PDAs, servers, data terminals, session initiation protocol (SIP) phones, satellite radios, global positioning systems (GPSs), multimedia devices, video devices, digital audio players (e.g., MP3 player, etc.), cameras, game consoles, smart devices (which may be wearable or non-wearable), vehicles, electric meters, gas pumps, large or small kitchen appliances, healthcare devices, implants, sensors/actuators, displays, and/or any other type of user equipment, and/or any combination thereof. One or more of the UEs 622 may be referred to as Internet-of-Things devices (e.g., parking meters, gas pumps, toasters, vehicles, heart monitors, etc.).

The system 600 of FIG. 6 includes standalone DUs 608, 610 and a standalone CU 615. However, another implementation of a system configured to allow support of multiple RUs on a single DU can include a combined DU-CU such that the multiple RUs can be supported on the combined DU-CU.

Standards of the O-RAN Alliance specify at least the following four planes: user plane (U-plane), control plane (C-plane), synchronization plane (S-plane), and management plane (M-plane). C-plane messages may include data-associated control information required for processing of user data (e.g., scheduling and beamforming commands). C-plane messages may be sent separately for downlink (DL) related commands and uplink (UL) related commands.

To support coordination of C-plane and U-plane timing, the O-RAN interface may specify that C-plane or U-plane messages must arrive at the O-RU till the time the C-plane or U-plane messages fall in their respective window.

The U-plane O-DU transmission window may be defined by the relationships above based on an O-RU reception window and max transport variation. In some implementations, this transmission window does not define the exact timing of transmission from the O-DU to the O-RU, and instead, may define boundaries that the U-plane O-DU transmission operate within. The transmission window may represent the mathematical boundaries imposed on the O-DU as a result of the O-RU, fronthaul delay, and transport constraints. The constraints may be defined for any one of O-DU, transport, and O-RU based on knowledge of the other two. However, the O-RU constraint may be predefined based on the equipment, transport, and overall network goals.

Figure 7:
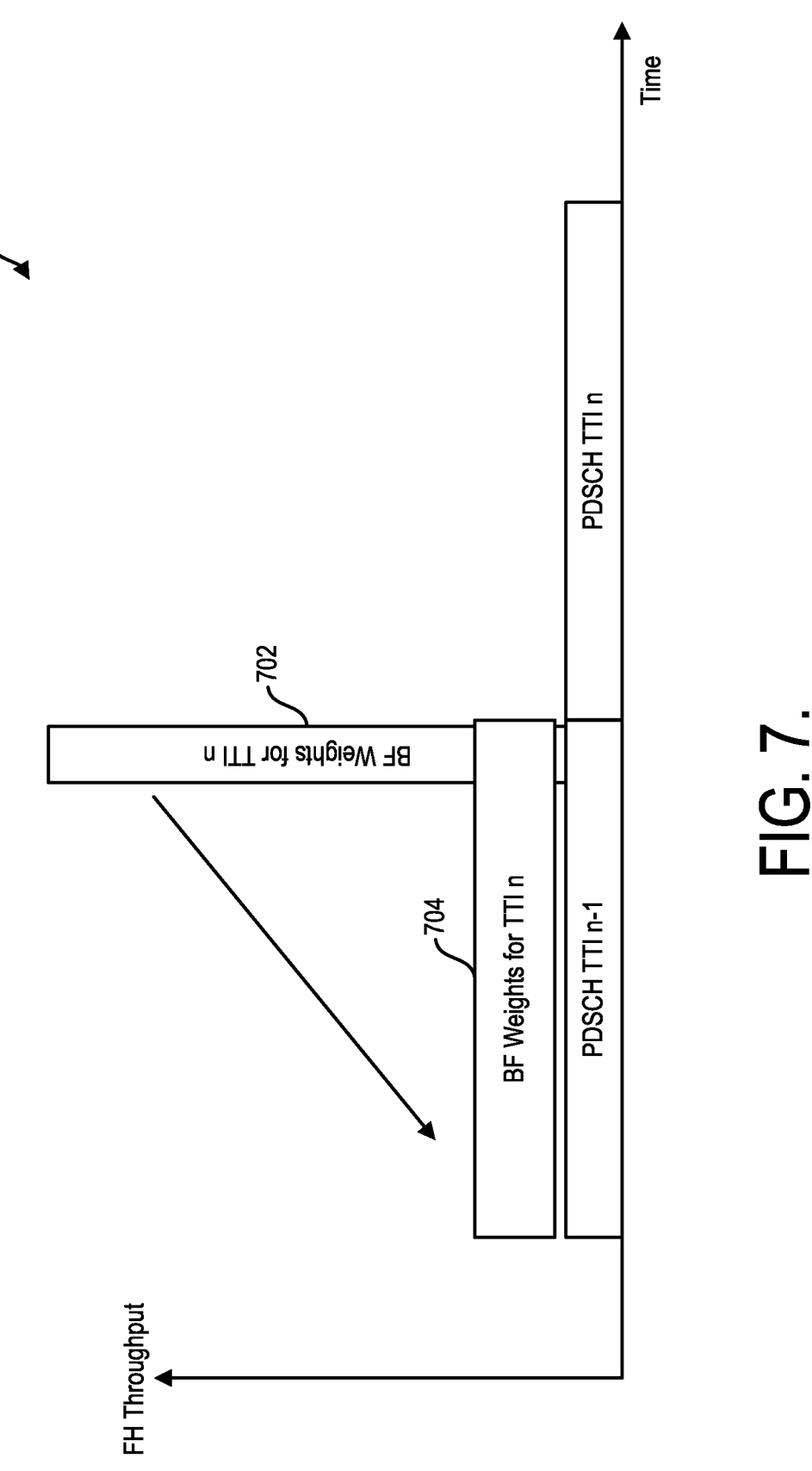
FIG. 7 illustrates a graph showing an example of fronthaul throughout vs. time.

The C-plane O-DU transmission window may follow the same concept as the U-plane O-DU transmit window. However, the C-plane O-DU transmission window may be larger in size and therefore, may start much earlier in time compared to the U-plane O-DU transmission window. In certain scenarios, such as transmitting beamforming (BF) weights in real-time for MIMO application, the C-plane messages may be spread over time to avoid peak throughput. FIG. 7 illustrates a chart 700 showing an example 702 of fronthaul (FH) throughput 702 in which C-plane messages are transmitted all at once in the same symbol unit and an example 704 of FH throughput 704 when C-plane messages are spread over time. As illustrated in FIG. 7, when the C-plane messages are spread over time (example 704), the FH throughput is reduced compared to transmitting the C-plane messages all at once in the same symbol unit (example 702).

Figure 8A:
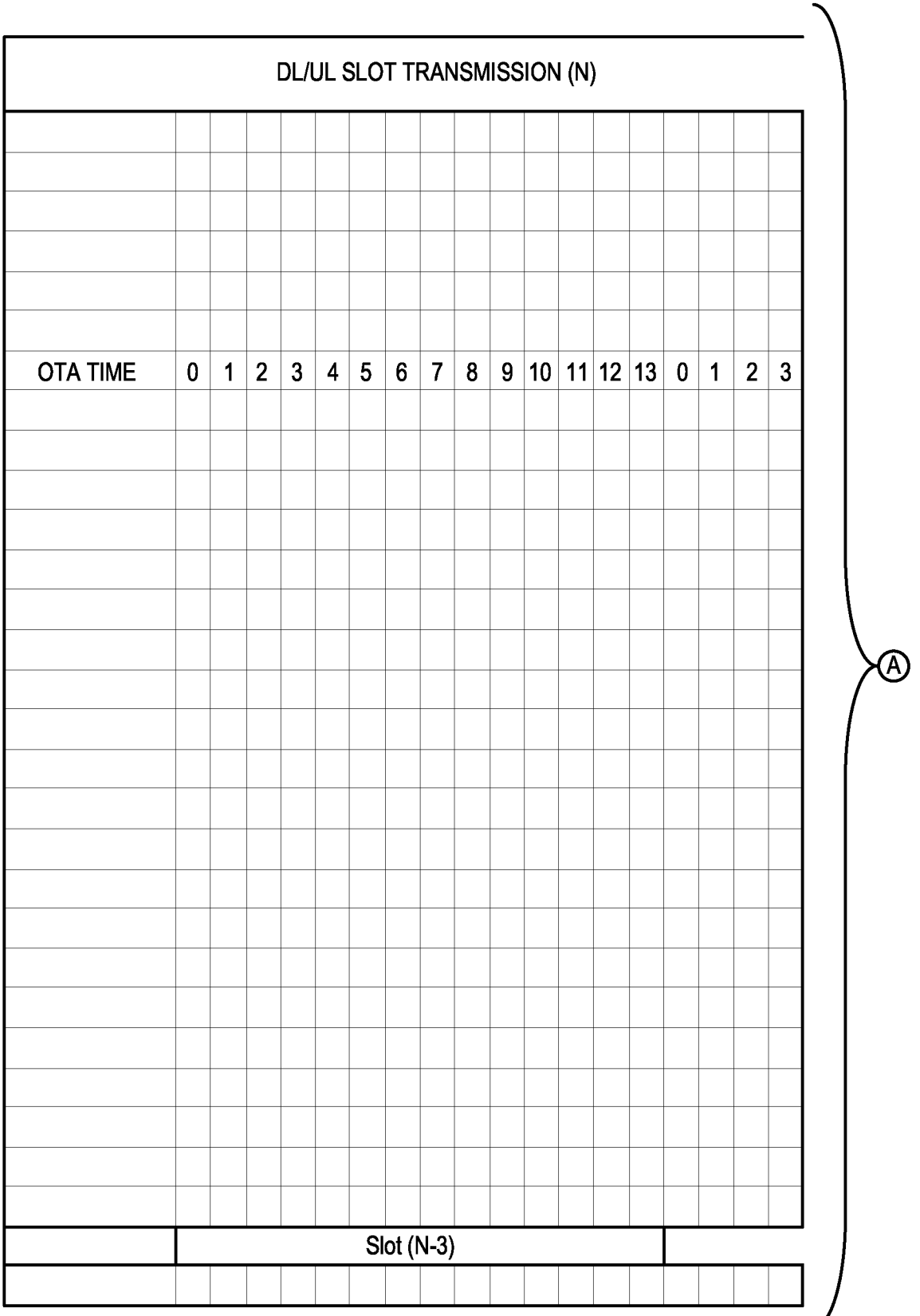
FIG. 8a illustrates a first portion of an example time transmission window.
Figure 8B:
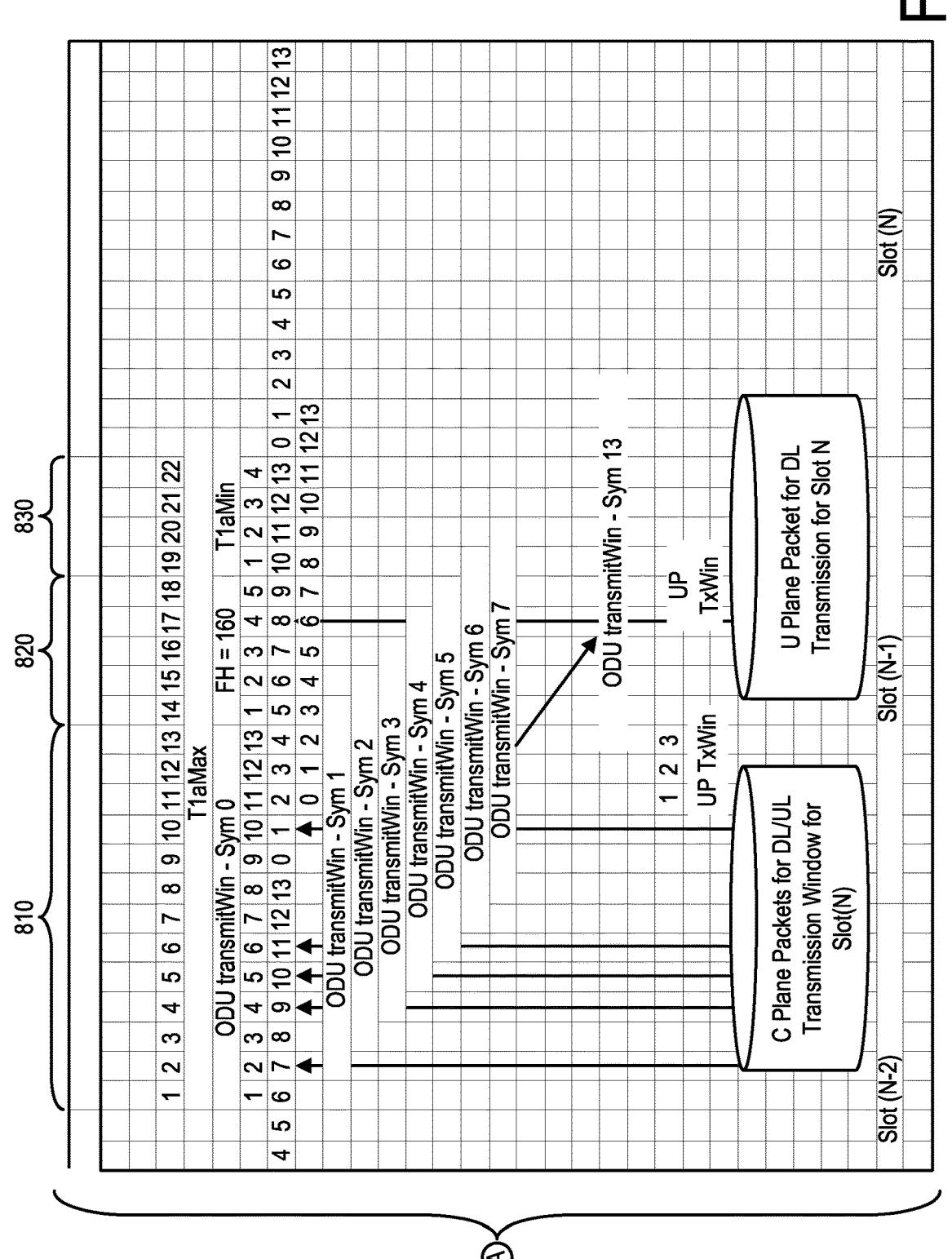

FIGS. 8A and 8B illustrate an implementation of a transmission time window between an O-RU (e.g., O-RUs 612 of FIG. 6, etc.) and an O-DU (e.g., O-DUs 608, 610 of FIG. 6, etc.). As illustrated in the implementation of FIGS. 8A and 8B, the transmission time window has a length of T1aMax. The transmission time window includes a transmission time interval (TTI) 810. The transmission time window also includes a FH processing interval 820 representing the time for data (e.g., packets) to travel from the O-DU to the O-RU via a FH network. The transmission time window also includes an O-RU processing time T1aMin 830 representing the time for processing data received at the O-RU from the O-DU. At the expiration of time T1aMin 830, the O-RU may transmit received data over a wireless communication network that includes the O-RU and the O-DU. For example, at the expiration of time T1aMin 830, the O-RU may transmit data over the wireless communication network to one or more UEs (e.g., UEs 622 of FIG. 6, etc.). Accordingly, if the O-DU transmits U-plane or C-plane packets at a timing such that the O-RU is unable to process the received packets within the O-RU processing time T1aMin 830, the O-RU may not transmit the packets at a timing in accordance with the O-RAN standard.

Figure 9:
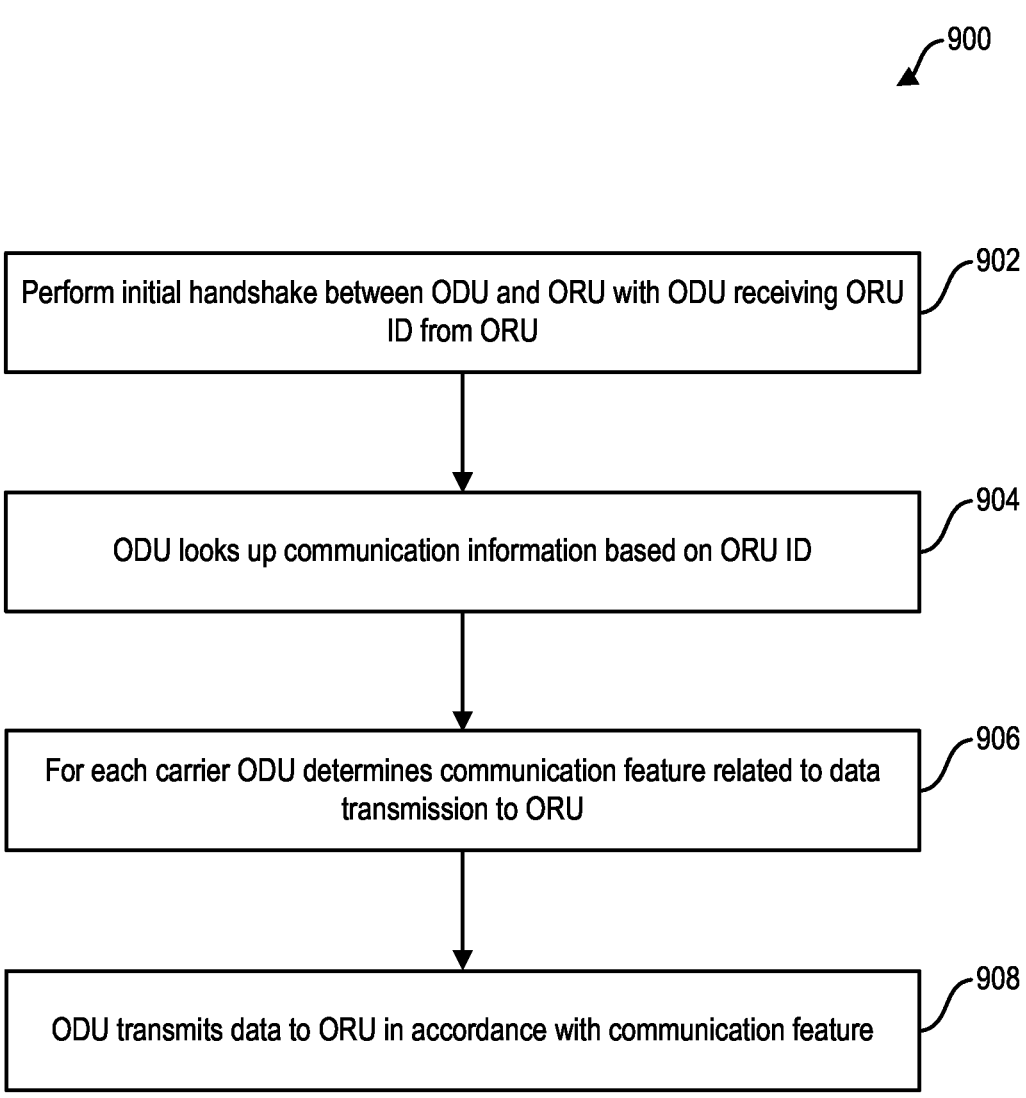
FIG. 9 illustrates an exemplary method, according to some implementations of the current subject matter.

The current subject matter describes various implementations of supporting multiple RUs on a single DU. FIG. 9 illustrates an exemplary method 900 of supporting multiple RUs on a single DU, according to some implementations of the current subject matter. Each of the RUs can be an ORU (e.g., O-RUs 612 of FIG. 6, etc.), and the DU can be an ODU (e.g., O-DUs 608, 610 of FIG. 6, etc.), as shown in FIG. 9.

The method 900 includes performing 902 an initial handshake between the ODU and the ORU, in accordance with O-RAN and 3GPP standards, with the ODU receiving an identifier from the ORU that identifies the ORU. Examples of the identifier include a serial number, a model number, an identification code assigned to the ORU by a vendor of the ORU, and other types of identifiers.

Having received the identifier that identifies the ORU, the ODU looks up 904 communication information based on the identifier. A memory at or otherwise accessible to the ODU can store correlation information that correlates communication information with each of a plurality of identifiers that identify different ORUs. Thus, by looking up 904 the ORU's identifier in the correlation information, the ODU can identify the communication information associated with that particular ORU. Communication information for any one ORU can be different from or the same as any of the other ORUs. At least some of the ORUs will typically have different communication information than at least some of the other ORUS. The communication information can include profile information for the ORU in accordance with O-RAN and 3GPP. Examples of the profile information include an interopability (IOT) profile, an extended antenna carrier identifier (eAxC_ID) profile, and a predefined beamforming profile.

The ODU also, for each carrier thereof, determines 906 a communication feature related to data transmission for the ORU from which the ODU received the identifier. The communication feature can include data to be transmitted from the ODU to the ORU and/or can define parameters of communication from the ODU to the ORU. Examples of the communication feature include a delay window for data transmission (e.g., a transmission time window), a DU PORT ID (which can be modified, as discussed below), and beamforming weights.

Having determined 908 the communication feature, the ODU transmits 908 data to ORU in accordance with the communication feature.

The method 900 can be performed with respect to a single ODU and a plurality of ORUs. The single ODU can thus be configured to support multiple ORUs with each of the ORUs having its own communication information and communication feature associated therewith. Carriers of the ODU can thus communicate with a particular one of the ORUs in accordance with that particular ORU's communication parameters even if those communication parameters are different from one or more other ones of the ORUs.

Exemplary implementations of the method 900 of FIG. 9 are described below with respect to FIGS. 10-15.

In some implementations, supporting multiple RUs on a single DU can include supporting a plurality of fronthaul interoperability (IOT) profiles on a single DU. One or more of the plurality of fronthaul IOT profiles can be the same as or distinct from any of the other fronthaul IOT profiles.

Figure 10:
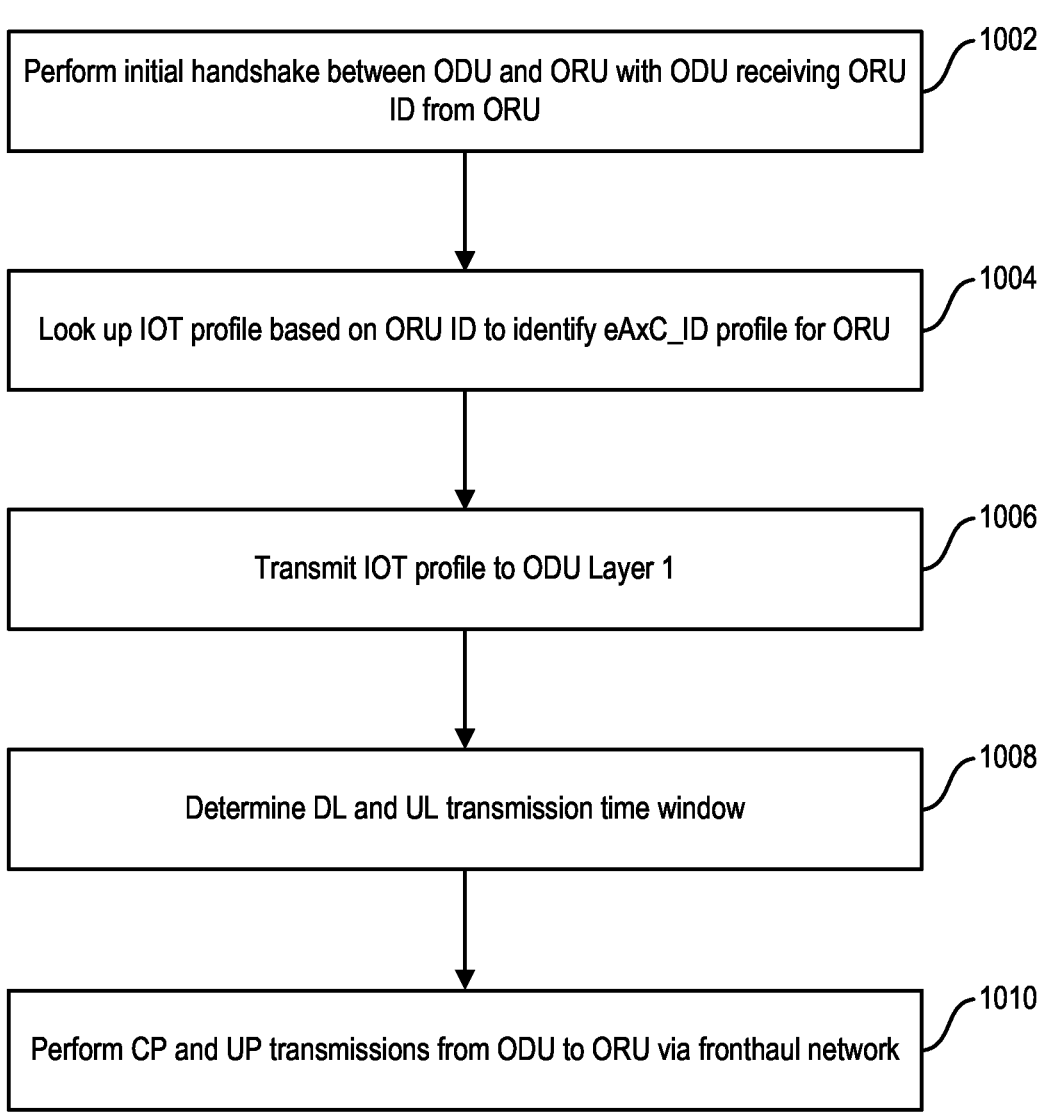
FIG. 10 illustrates another exemplary method, according to some implementations of the current subject matter.

FIG. 10 illustrates an exemplary method 1000 of supporting a plurality of fronthaul IOT profiles on a single DU, according to some implementations of the current subject matter. The method 1000 of FIG. 10 is described with respect to an exemplary system 1100 illustrated in FIG. 11 but can be implemented similarly with other systems.

Figure 11:
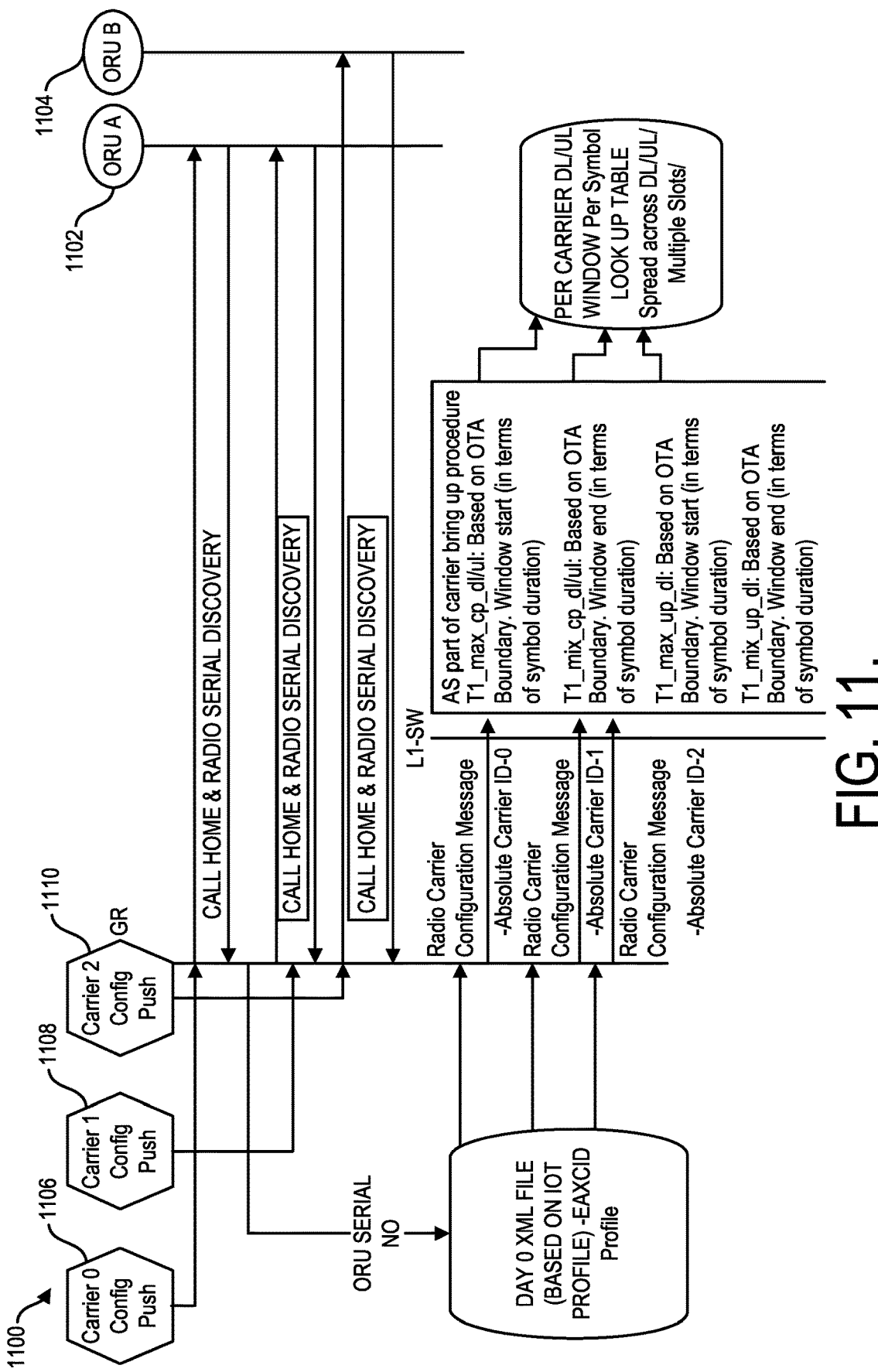
FIG. 11 illustrates an exemplary system in which the method of FIG. 10 is implemented, according to some implementations of the current subject matter.

The system 1100 of FIG. 11 includes an ODU (e.g., ODU 608 of FIG. 6, ODU 610 of FIG. 6, etc.) and a plurality of RUs 1102, 10104 (e.g., ORUs 612 of FIG. 6, etc.). First and second RUs 1102, 1104 are shown in FIG. 11 (respectively labeled "ORU A" and "ORU B" in FIG. 11), but the system 1100 can include another plural number of ORUs each configured to communicate with the ODU. The ODU in this illustrated implementation includes three carriers: a first carrier 1106 (labeled "Carrier 0" in FIG. 11), a second carrier 1108 (labeled "Carrier 1" in FIG. 11), and a third carrier 1110 (labeled "Carrier 2" in FIG. 11). However, the ODU can include another number of carriers each configured to communicate with one or more ORUs.

The system 1100 can be implemented in a 5G wireless communication system, an LTE wireless communication system, or another wireless communications system, such as a 6G or later generation wireless communications system.

The method 1000 includes performing 1002 an initial handshake between the ODU and each of the ORUs 1102, 1104, in accordance with O-RAN and 3GPP standards. This performance 1002 of an initial handshake corresponds to the performance 902 of FIG. 9. In the initial handshake process, the ODU receives a first identifier from the first ORU 1102 that identifies the first ORU 1102, and the ODU receives a second identifier from the second ORU 1102 that identifies the second ORU 1104. As shown in FIG. 11, an initial handshake is performed between the first carrier 1106 of the ODU and the first ORU 1102, an initial handshake is performed between the second carrier 1108 of the ODU and the first ORU 1102, and an initial handshake is performed between the third carrier 1110 of the ODU and the second ORU 1104.

Having received the identifier that identifies the ORU, the ODU looks up 1004 communication information based on the identifier. This lookup 1004 corresponds to the lookup 904 of FIG. 9. As shown in FIGS. 10 and 11, the communication information in this implementation includes an IOT profile. The ODU can thus look up 1004 an IOT profile for the first RU 1102 based on the first identifier and can look up 1004 an IOT profile for the second RU 1104 based on the second identifier.

Similar to that discussed above with respect to FIG. 9, a memory at or otherwise accessible to the ODU can store correlation information that correlates each of a plurality of IOT profiles with each of a plurality of identifiers that identify different ORUs that include the first and second RUs 1102, 1104. IOT profiles are defined profiles, e.g., per O-RAN. Thus, by looking up 1004 the first ORU's identifier in the correlation information, the ODU can identify the IOT profile associated with the first RU 1102, and by looking up 1004 the second ORU's identifier in the correlation information, the ODU can identify the IOT profile associated with the second RU 1104. FIG. 11 shows the correlation information as an XML file, but the correlation information can be in another format.

As shown in FIG. 11, looking up 1004 the IOT profile for an ORU based on the ORU's identifier allows the ODU to identify an eAxC_ID profile for the ORU. eAxC_ID profiles are defined profiles, e.g., per O-RAN.

The lookup 1004 can be performed at layer 3 of the ODU, in accordance with standardized ability of layer 3. The IOT profile retrieved for a particular ORU can thus be transmitted 1006 from layer 3 of the ODU to layer 1 of the ODU. Because there are three carriers 1106, 1108, 1110 in this illustrated implementation, FIG. 11 shows three arrows for the transmission 1006 to layer 1 (labeled L1-SW in FIG. 11, to reflect that layer 1 (L1) software (SW) of the ODU is handling data). As also shown in FIG. 11, each of the IOT profiles can be associated with its associated carrier 1106, 1108, 1110 with an absolute carrier identifier (ID), e.g., "0" for Carrier 0 1106, "1" for Carrier 1 1108, and "2" for Carrier 2 1110.

Having received the IOT profile for a particular ORU, the ODU, e.g., layer 1 thereof, determines 1008 for the associated carrier, e.g., as indicated by the absolute carrier ID, downlink (DL) and uplink (UL) transmission time window. This determining 1008 corresponds to the determining 906 of a communication feature of FIG. 9. The ODU can thus determine 1008 the DL and UL transmission time window that a particular carrier should use with respect to a particular ORU. The ODU can therefore support different transmission time windows for different ORUs. As discussed above and as shown in FIG. 11, the downlink (DL) and uplink (UL) transmission time window for a particular carrier and particular ORU can include T1_max_cp_dl/ul representing a window start (in terms of symbol duration) for C-plane data in downlink/uplink directions based on an over the air (OTA) boundary, T1_min_cp_dl/ul representing a window end (in terms of symbol duration) for C-plane data in downlink/uplink directions based on an OTA boundary, T1_max_up_dl representing a window start (in terms of symbol duration) for U-plane data in the downlink direction based on an OTA boundary, and T1_min_up_dl representing a window end (in terms of symbol duration) for U-plane data in the downlink direction based on an OTA boundary.

As shown in the illustrated implementation of FIG. 11, the determining 1008 can include looking up the DL and UL transmission time window in a look up table that associates DL and UL transmission time windows to eAxC_ID profiles. The look up table can be stored in a memory at or otherwise accessible to the ODU. The ODU, e.g., L1 thereof, can look up the eAxC_ID profile for a particular ORU and identify the DL and UL transmission time window associated therewith.

Having determined 1008 the DL and UL transmission time window that a particular carrier should use with respect to a particular ORU, the ODU, e.g., via that particular carrier, can perform 1010 C-plane and U-plane transmissions with that particular ORU via a FH network (labeled "FH link" in FIG. 11).

The illustration of contemporaneous arrows in FIG. 11 should not be taken to indicate that all the initial handshakes occur simultaneously, that the IOT profiles are all looked up 1004 at a same time, that the IOT profiles are all transmitted 1006 to layer 1 at a same time, or that the determinations 1008 are all made at a same time. Instead, a timing of the initial handshake, which can be triggered in accordance with 3GPP and O-RAN when a carrier is booted up, involving a particular carrier and a particular ORU determines when subsequent portions of the method 1000 are performed.

In some implementations, supporting multiple RUs on a single DU can include supports multiple carriers on the single DU.

Figure 12:
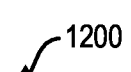
FIG. 12 illustrates yet another exemplary method, according to some implementations of the current subject matter.
Figure 12:
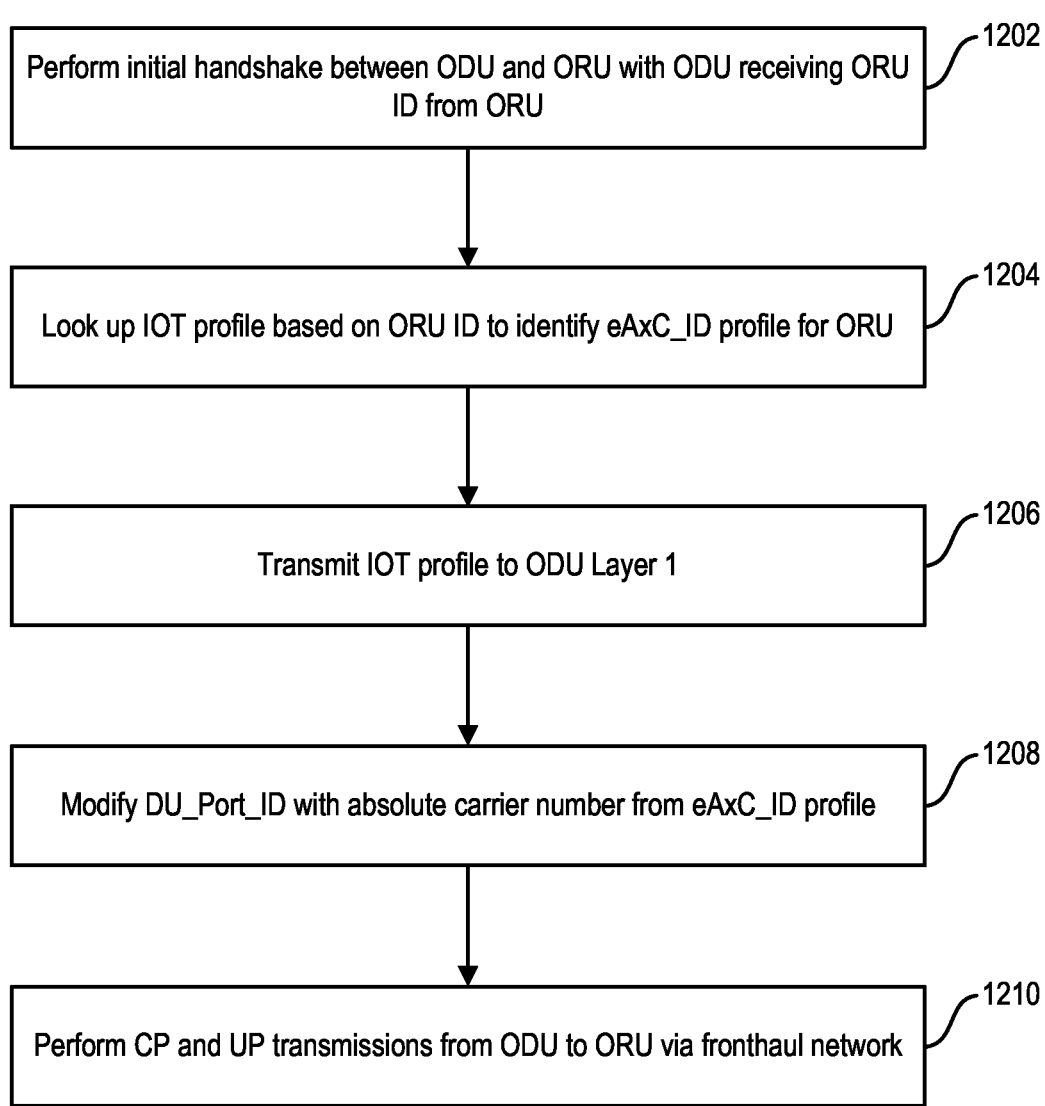

FIG. 12 illustrates an exemplary method 1200 of supporting multiple carriers on the single DU, according to some implementations of the current subject matter. The method 1200 of FIG. 12 is described with respect to an exemplary system 1300 illustrated in FIG. 13 but can be implemented similarly with other systems.

Figure 13:
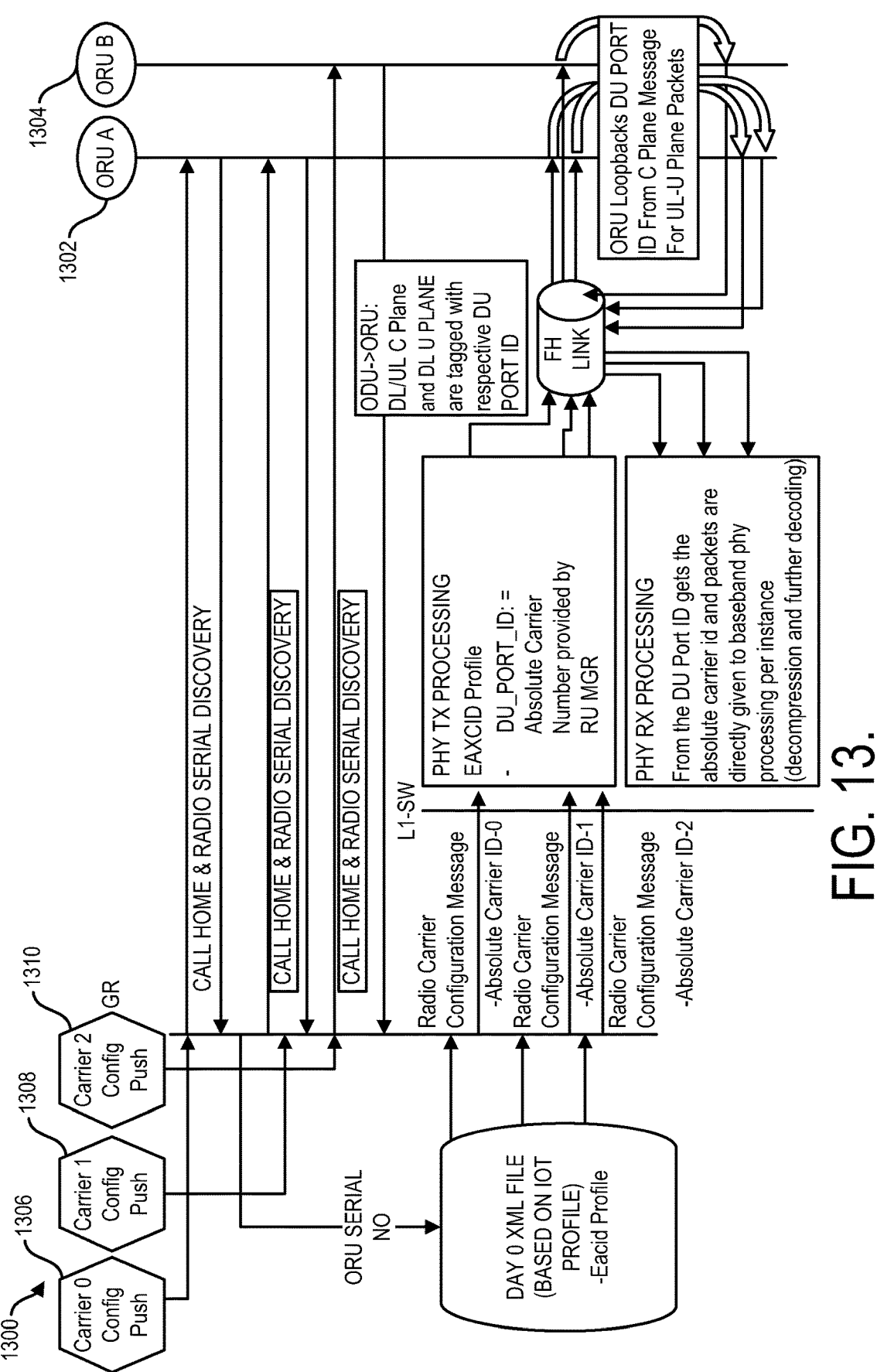
FIG. 13 illustrates an exemplary system in which the method of FIG. 12 is implemented, according to some implementations of the current subject matter.

The system 1300 of FIG. 13 includes an ODU (e.g., ODU 608 of FIG. 6, ODU 610 of FIG. 6, etc.) and a plurality of RUs 1302, 1304 (e.g., ORUs 612 of FIG. 6, etc.). First and second RUs 1302, 1304 are shown in FIG. 13 (respectively labeled "ORU A" and "ORU B" in FIG. 13), but the system 1300 can include another plural number of ORUs each configured to communicate with the ODU. The ODU in this illustrated implementation includes three carriers: a first carrier 1306 (labeled "Carrier 0" in FIG. 13), a second carrier 1308 (labeled "Carrier 1" in FIG. 13), and a third carrier 1310 (labeled "Carrier 2" in FIG. 13). However, the ODU can include another number of carriers each configured to communicate with one or more ORUs.

The system 1300 can be implemented in a 5G wireless communication system, an LTE wireless communication system, or another wireless communications system, such as a 6G or later generation wireless communications system.

The method 1200 includes performing 1202 an initial handshake between the ODU and each of the ORUs 1302, 1304, the ODU looking up 1204 communication information based on the identifier, and transmitting 1206 the communication information from layer 3 of the ODU to layer 1 of the ODU. The performing 1202, the looking up 1204, and the transmitting 1206 of FIG. 12 correspond to the performing 1002, the looking up 1004, and the transmitting 1006 of FIG. 10 and are thus not specifically described again. The communication information in the illustrated implementation of FIG. 12 thus includes an IOT profile, as discussed above with respect to FIG. 10 and as shown in FIG. 13. Additionally, as discussed above and as shown in FIG. 13, looking up the IOT profile for an ORU based on the ORU's identifier allows the ODU to identify an eAxC_ID profile for the ORU.

Having received the IOT profile for a particular ORU in association with a particular carrier, the ODU, e.g., layer 1 thereof, the ODU has received a distributed unit identifier ("DU PORT ID" or "DU_Port_ID") since an eAxC_ID profile is defined to include a DU PORT ID field. As discussed above, the IOT profile is associated with the particular carrier with an absolute carrier ID, e.g., "0" for Carrier 0 1306, "1" for Carrier 1 1308, and "2" for Carrier 2 1310.

The method 1200 includes the ODU, e.g., layer 1 thereof, modifying 1208 the DU PORT ID in view of the particular carrier. This modifying 1208 corresponds to the determining 906 of a communication feature of FIG. 9. As shown in FIG. 13, the modification 1208 of the DU PORT ID can include modifying the DU PORT ID to be the absolute carrier ID for the particular carrier, such as by replacing the value of the DU PORT ID with the value of absolute carrier ID. An ORU does not operate or modify the DU PORT ID field, per 3GPP and O-RAN, so the DU PORT ID can be modified and can be transmitted as modified to the ORU without affecting proper functioning of the ORU.

Having modified 1208 the DU PORT ID, the ODU can perform 1210 C-plane and U-plane transmissions with that particular ORU via a FH network (labeled "FH link" in FIG. 13). As shown in FIG. 13, UL and DL C-plane data and DL U-plane data can be tagged with the modified DU PORT ID. The ODU can therefore recognize from the modified DU PORT ID the particular one of the carriers 1300, 1302, 1304 associated with a particular transmission. For UL U-plane data, as also shown in FIG. 13, the ORU loops back the modified DU PORT ID from C-plane data received from the ODU to U-plane data to be transmitted to the ORU in the uplink direction. The ODU can thus receive the modified DU PORT ID with U-plane data transmitted from the ORU to the ODU, thereby identifying the proper carrier to the ODU.

The illustration of contemporaneous arrows in FIG. 13 should not be taken to indicate that all the initial handshakes occur simultaneously, that the IOT profiles are all looked up 1204 at a same time, that the IOT profiles are all transmitted 1206 to layer 1 at a same time, or that the modifications 1208 are all performed at a same time. Instead, a timing of the initial handshake, which can be triggered in accordance with 3GPP and O-RAN when a carrier is booted up, involving a particular carrier and a particular ORU determines when subsequent portions of the method 1200 are performed.

In some implementations, supporting multiple RUs on a single DU can include supporting multiple beamforming profiles for single or multiple massive MIMO RUS.

Figure 14:
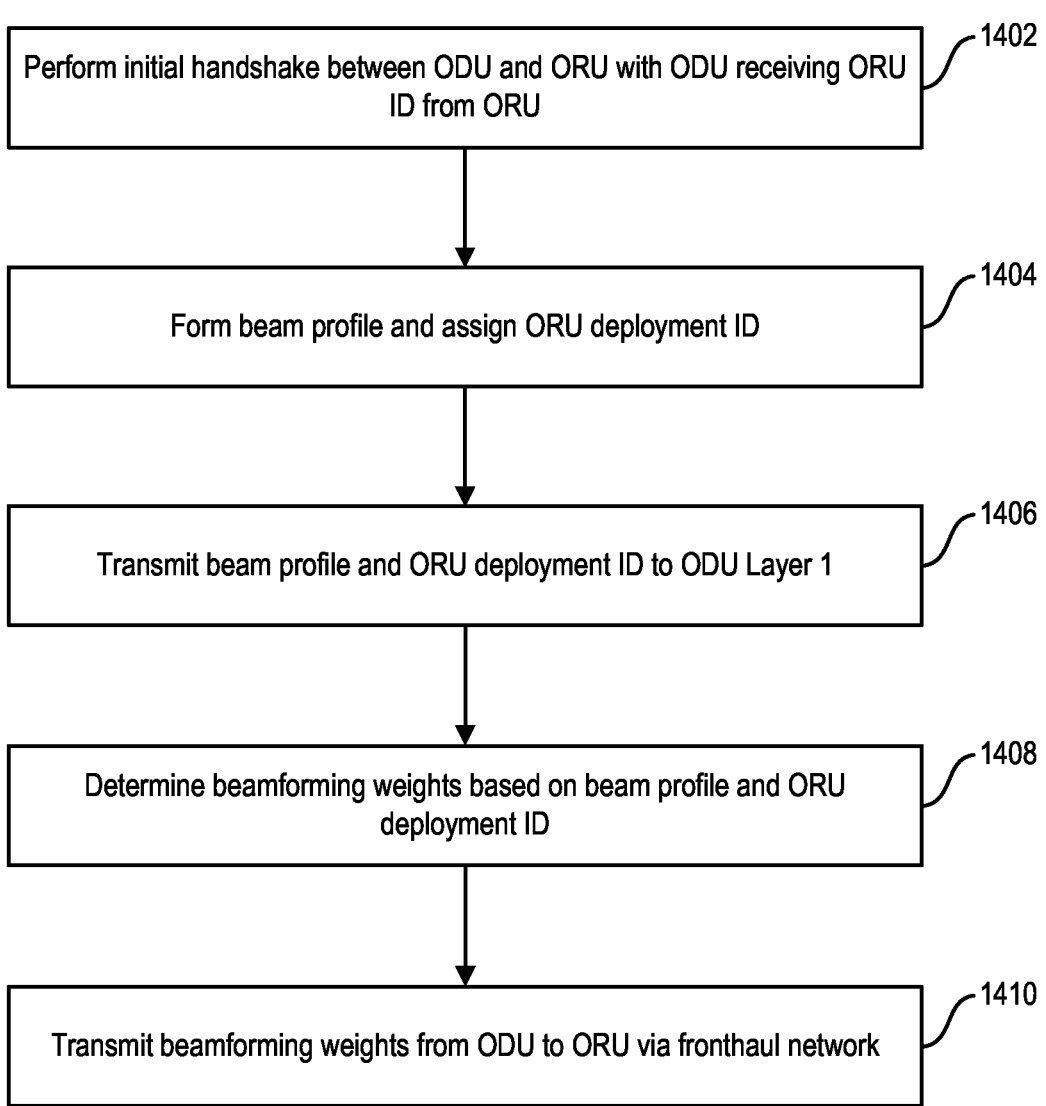
FIG. 14 illustrates still another exemplary method, according to some implementations of the current subject matter.

FIG. 14 illustrates an exemplary method 1400 of supporting multiple beamforming profiles for single or multiple massive MIMO RUs, according to some implementations of the current subject matter. The method 1400 of FIG. 14 is described with respect to an exemplary system 1500 illustrated in FIG. 15 but can be implemented similarly with other systems.

Figure 15:
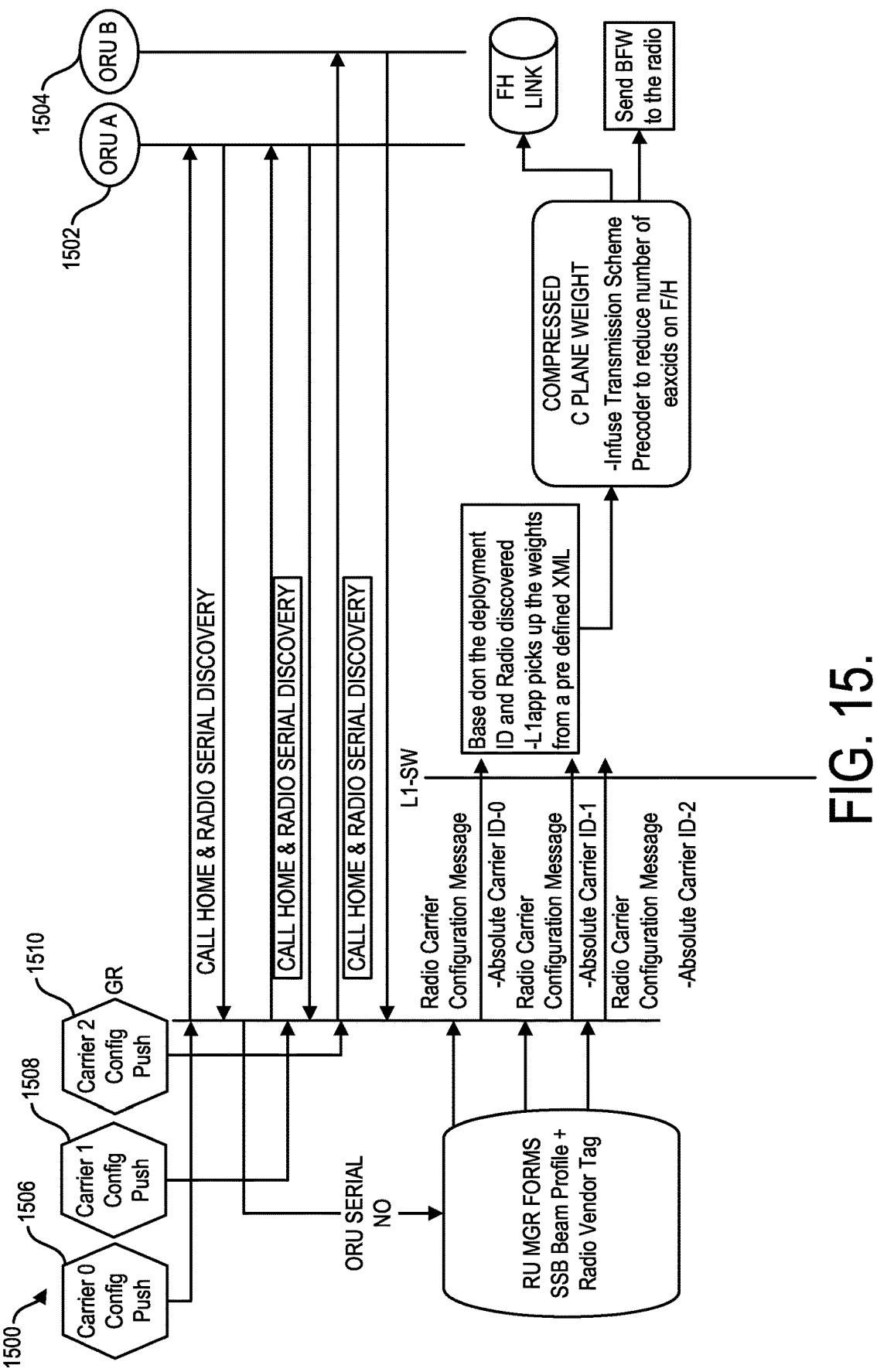
FIG. 15 illustrates an exemplary system in which the method of FIG. 14 is implemented, according to some implementations of the current subject matter.

The system 1500 of FIG. 15 includes an ODU (e.g., ODU 608 of FIG. 6, ODU 610 of FIG. 6, etc.) and a plurality of RUs 1502, 1504 (e.g., ORUs 612 of FIG. 6, etc.). First and second RUs 1502, 1504 are shown in FIG. 15 (respectively labeled "ORU A" and "ORU B" in FIG. 15), but the system 1500 can include another plural number of ORUs each configured to communicate with the ODU. The ODU in this illustrated implementation includes three carriers: a first carrier 1506 (labeled "Carrier 0" in FIG. 15), a second carrier 1508 (labeled "Carrier 1" in FIG. 15), and a third carrier 1510 (labeled "Carrier 2" in FIG. 15). However, the ODU can include another number of carriers each configured to communicate with one or more ORUs.

The system 1500 can be implemented in a 5G wireless communication system, an LTE wireless communication system, or another wireless communications system, such as a 6G or later generation wireless communications system.

The method 1400 includes performing 1402 an initial handshake between the ODU and each of the ORUs 1502, 1504. The performing 1402 of FIG. 14 corresponds to the performing 1002 of FIG. 10 and is thus not specifically described again.

Having received the identifier that identifies the ORU, the ODU forms 1404 a beam profile based on the identifier and assigns a deployment ID. This forming 1404 corresponds to the lookup 904 of FIG. 9. As shown in FIGS. 14 and 15, the communication information in this implementation includes a beam profile. The beam profile includes beamforming weights.

Similar to that discussed above with respect to FIG. 9, a memory at or otherwise accessible to the ODU can store correlation information that correlates each of a plurality of predefined beam profiles with each of a plurality of identifiers that identify different ORUs that include the first and second RUs 1502, 1504. Beam profiles are defined parameters, e.g., per 3GPP. Thus, by looking up the first ORU's identifier in the correlation information, the ODU can identify the beam profile associated with the first RU 1502, and by looking up the second ORU's identifier in the correlation information, the ODU can identify the beam profile associated with the second RU 1504. The ODU can thus look up a beam profile for the first RU 1502 based on the first identifier and can look up a beam profile for the second RU 1504 based on the second identifier.

As mentioned above, the ODU assigns a deployment ID to the beam profile. As shown in FIG. 15, the deployment ID can be an ORU vendor tag (radio vendor tag), e.g., ORU-MODEL_DEPLOYMENTID, that identify a vendor of the ORU. The deployment ID can thus correspond to the identifier received from a particular ORU.

The forming 1404 of the beam profile and the assignment of the deployment ID can be performed at layer 3 of the ODU, in accordance with standardized ability of layer 3. The beam profile and assigned deployment ID for a particular ORU can thus be transmitted 1406 from layer 3 of the ODU to layer 1 of the ODU. Because there are three carriers 1506, 1508, 1510 in this illustrated implementation, FIG. 15 shows three arrows for the transmission 1406 to layer 1 (labeled L1-SW in FIG. 15, to reflect that L1 SW of the ODU is handling data).

Having received the beam profile and assigned deployment ID for a particular ORU, the ODU, e.g., layer 1 thereof, determines 1408 for the particular ORU, beamforming weights based on the beam profile and assigned deployment ID. This determining 1408 corresponds to the determining 906 of a communication feature of FIG. 9. The ODU can thus determine 1408 the beamforming weights for the C-plane that a particular carrier should transmit to a particular ORU.

As shown in the illustrated implementation of FIG. 15, the determining 1408 can include looking up the deployment ID in a look up table that associates deployment ID to beamforming weights. The look up table can be stored in a memory at or otherwise accessible to the ODU. The ODU, e.g., L1 thereof, can look up the deployment ID for a particular ORU and identify the beamforming weights associated therewith. Different vendors of ORUs can require different beamforming weights, so use of the deployment ID can allow appropriate beamforming weights to be chosen for a particular ORU among multi-vendor ORUs that may all be supported by the ODU. Also, a single model of an ORU can be used, as different bandwidth and different carrier frequency can lead to different beamforming weights being needed for use with the same ORU model. Using a subset of beamforming weights may also be possible depending upon the deployment scenario, such as indoor or outdoor, a particular street, etc.

Having determined 1408 the beamforming weights, the ODU can transmit 1410 the beamforming weights to the particular ORU via a FH network (labeled "FH link" in FIG. 15). In some implementations, the beamforming weights can be transmitted to the particular ORU with a number of Tx antennas, a number of Rx antennas, and a number of beams present.

The illustration of contemporaneous arrows in FIG. 15 should not be taken to indicate that all the initial handshakes occur simultaneously, that the beam profiles are all formed 1404 and all deployment IDs assigned at a same time, that the beam profiles and the deployment IDs are all transmitted 1406 to layer 1 at a same time, that the beamforming weights are all determined 1408 at a same time, or that the beamforming weights are transmitted 1410 to all of the ORUs 1502, 1504 at a same time. Instead, a timing of the initial handshake, which can be triggered in accordance with 3GPP and O-RAN when a carrier is booted up, involving a particular carrier and a particular ORU determines when subsequent portions of the method 1400 are performed.

In some implementations, more than one of the methods 1000, 1200, 1400 can be performed in a system. In some implementations, only one of the methods 1000, 1200, 1400 can be performed in a system.

Figure 16:
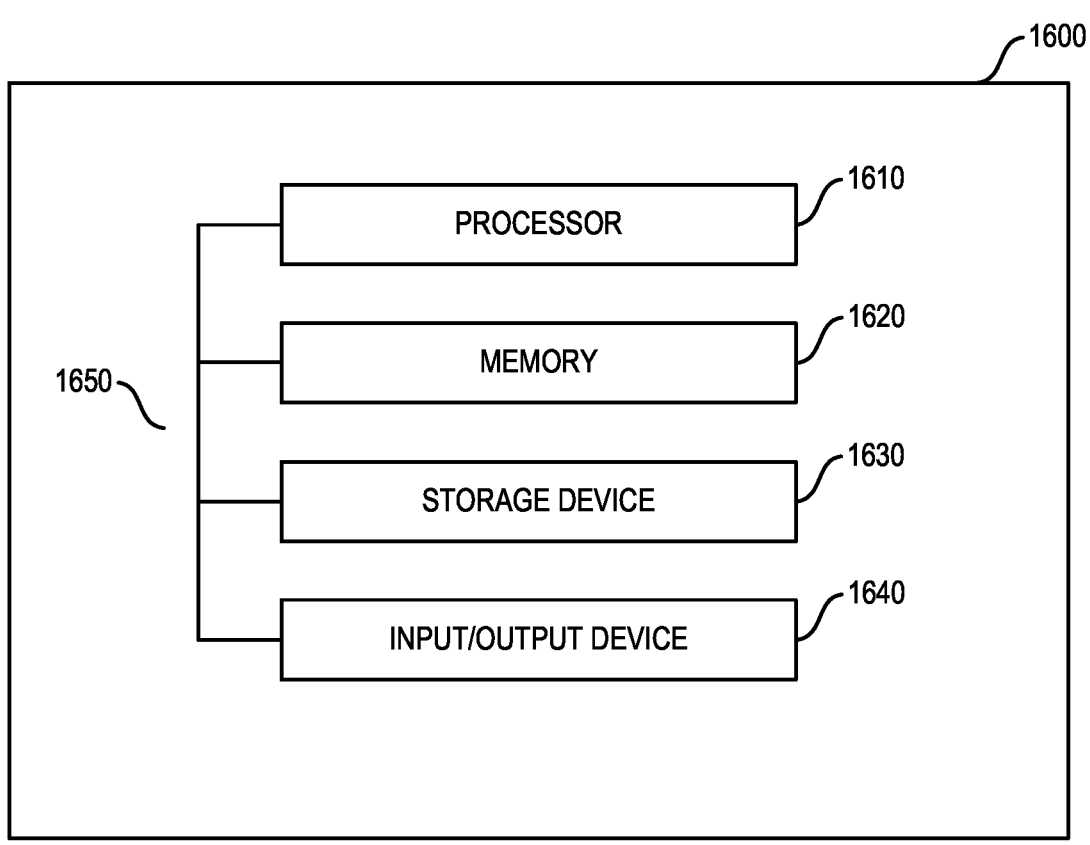
FIG. 16 illustrates an exemplary system, according to some implementations of the current subject matter.

In some implementations, the current subject matter can be configured to be implemented in a system 1600, as shown in FIG. 16. The system 1600 can include one or more of a processor 1610, a memory 1620, a storage device 1630, and an input/output device 1640. Each of the components 1610, 1620, 1630 and 1640 can be interconnected using a system bus 1650. The processor 1610 can be configured to process instructions for execution within the system 600. In some implementations, the processor 1610 can be a single-threaded processor. In alternate implementations, the processor 1610 can be a multi-threaded processor. The processor 1610 can be further configured to process instructions stored in the memory 1620 or on the storage device 1630, including receiving or sending information through the input/output device 1640. The memory 1620 can store information within the system 1600. In some implementations, the memory 1620 can be a computer-readable medium. In alternate implementations, the memory 1620 can be a volatile memory unit. In yet some implementations, the memory 1620 can be a non-volatile memory unit. The storage device 1630 can be capable of providing mass storage for the system 1600. In some implementations, the storage device 1630 can be a computer-readable medium. In alternate implementations, the storage device 1630 can be a floppy disk device, a hard disk device, an optical disk device, a tape device, non-volatile solid state memory, or any other type of storage device. The input/output device 1640 can be configured to provide input/output operations for the system 1600. In some implementations, the input/output device 1640 can include a keyboard and/or pointing device. In alternate implementations, the input/output device 1640 can include a display unit for displaying graphical user interfaces.

FIG. 17 illustrates an exemplary method 1700 for supporting multiple RUs on a single, according to some implementations of the current subject matter. The method 1700 may be performed, for example, using implementations shown in and described with respect to FIGS. 6-15.

The method 1700 includes receiving, by a DU (e.g., ODU 608 of FIG. 6, ODU 610 of FIG. 6, ODU of FIG. 11, ODU of FIG. 13, ODU of FIG. 15, etc.) in an open radio access network from an RU (e.g., RU 612*a* of FIG. 6, RU 612*b* of FIG. 6, RU 612*c* of FIG. 6, RU 612*d* of FIG. 6, RU 612*e* of FIG. 6, ORU A 1102 of FIG. 11, ORU B 1104 of FIG. 11, ORU A 1302 of FIG. 13, ORU B 1304 of FIG. 13, ORU A 1502 of FIG. 15, ORU B 1504 of FIG. 15, etc.) in the open radio access network, an identifier that identifies the RU. The method can also include identifying, by the DU, communication information associated with the RU based on the identifier that identifies the RU, determining, by the DU, a communication feature related to data transmission to the RU using a particular carrier (e.g., Carrier 0 of FIG. 11, FIG. 13, or FIG. 15; Carrier 1 of FIG. 11, FIG. 13, or FIG. 15; Carrier 2 of FIG. 11, FIG. 13, or FIG. 15; etc.) of the DU, and transmitting data from the DU to the RU, using the particular carrier, in accordance with the communication information and the communication feature.

In some implementations, the current subject matter can include one or more of the following optional features.

In some implementations, the communication information can include an IOT profile, and the communication feature can include a delay window for data transmission. Further, the identifying can include looking the identifier up in a lookup table stored in the at least one non-transitory storage media, and the lookup table can uniquely associate each of a plurality of RU identifiers with an IOT profile; and/or the data can be transmitted via a fronthaul network and can include control plane (C-plane) data and user plane (U-plane) data. See, for example, FIGS. 10 and 11.

In some implementations, the communication information can include an extended antenna carrier identifier (eAx-C_ID) that includes a DU PORT ID, and determining the communication feature can include modifying the DU PORT ID. Further, the data can be transmitted via a fronthaul network and can include U-plane data. Further, the method can also include transmitting, from the DU to the RU, the modified DU PORT ID on the U-plane, and the RU can be configured to loop the received modified DU PORT ID to a C-plane. See, for example, FIGS. 12 and 13.

In some implementations, identifying the communication information can include forming a beamforming profile and assigning a deployment ID to the RU, and the communication feature can include beamforming weights. Further, transmitting the data can include transmitting the beamforming weights from the DU to the RU, and/or determining the communication feature can include identifying which beamforming weights of a plurality of predefined beamforming weights correlate to the assigned deployment ID. See, for example, FIGS. 14 and 15.

In some implementations, the method can also include transmitting the identified communication information from layer 3 of the DU to layer 1 of the DU, and layer 1 of the DU can perform the determining. See, for example, FIGS. 10-15.

In some implementations, the DU can receive the identifier from the RU in an initial handshake process between the DU and the RU. See, for example, FIGS. 10-15.

In some implementations, the DU can be a single DU; the method can also include receiving, by the DU from a second RU in the open radio access network, an identifier that identifies the second RU: the method can also include identifying, by the DU, communication information associated with the second RU based on the identifier that identifies the second RU: the method can also include determining, by the DU, a communication feature related to data transmission to the second RU using a second particular carrier of the DU; and the method can also include transmitting data from the DU to the second RU, using the second particular carrier, in accordance with the communication information associated with the second RU and the communication feature related to data transmission to the second RU. See, for example, FIGS. 10-15.

In some implementations, a base station can include at least one processor and at least one non-transitory storage media storing instructions that, when executed by the at least one processor, cause the at least one processor to perform operations; the base station can be configured to communicate in a wireless communications network, and the operations can include the method. Further, the base station can includes an eNodeB or a gNodeB.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order: as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
   at least one processor, and
   at least one non-transitory storage media storing instructions that, when executed by the at least one processor, cause the at least one processor to:
   receive, by a distributed unit (DU) in an open radio access network from a radio unit (RU) in the open radio access network, an identifier that identifies the RU, identify, by the DU, communication information associated with the RU, from among a plurality of pre-stored communication information associated with a plurality of RUs, based on the identifier that identifies the RU,
   determine, by the DU, a communication feature related to data transmission to the RU, from among a plurality of pre-stored communication features respectively corresponding to a plurality of carriers, using a particular carrier of the DU, the particular carrier identified based on the identified communication information, and
   transmit data from the DU to the RU, using the particular carrier, in accordance with the communication information and the communication feature,
   wherein the identify includes looking the identifier up in a lookup table stored in the at least one non-transitory storage media, the lookup table uniquely associating each of a plurality of RU identifiers with an interoperability (IOT) profile.

2. The apparatus of claim 1, wherein the communication information includes the interoperability (IOT) profile; and
   the communication feature includes a delay window for data transmission.

3. The apparatus of claim 2, wherein the data is transmitted via a fronthaul network and includes control plane (C-plane) data and user plane (U-plane) data.

4. The apparatus of claim 1, wherein the communication information includes an extended antenna carrier identifier (eAxC_ID) that includes a DU PORT ID; and
   determining the communication feature includes modifying the DU PORT ID.

5. The apparatus of claim 4, wherein the data is transmitted via a fronthaul network and includes user plane (U-plane) data.

6. The apparatus of claim 5, wherein the operations further comprise transmitting, from the DU to the RU, the modified DU PORT ID on the U-plane; and
   the RU is configured to loop the received modified DU PORT ID to a control plane (C-plane).

7. The apparatus of claim 1, wherein identifying the communication information includes forming a beamforming profile and assigning a deployment ID to the RU; and
   the communication feature includes beamforming weights.

8. The apparatus of claim 7, wherein transmitting the data includes transmitting the beamforming weights from the DU to the RU.

9. The apparatus of claim 7, wherein determining the communication feature includes identifying which beamforming weights of a plurality of predefined beamforming weights correlate to the assigned deployment ID.

10. The apparatus of claim 1, wherein the operations further comprise transmitting the identified communication information from layer 3 of the DU to layer 1 of the DU; and
    layer 1 of the DU performs the determining.

11. The apparatus of claim 1, wherein the DU receives the identifier from the RU in an initial handshake process between the DU and the RU.

12. The apparatus of claim 1, wherein the DU is a single DU; and
    the operations further comprise:
    receiving, by the DU from a second RU in the open radio access network, an identifier that identifies the second RU,
    identifying, by the DU, communication information associated with the second RU based on the identifier that identifies the second RU, determining, by the DU, a communication feature related to data transmission to the second RU using a second particular carrier of the DU, and transmitting data from the DU to the second RU, using the second particular carrier, in accordance with the communication information associated with the second RU and the communication feature related to data transmission to the second RU.

13. The apparatus of claim 1, wherein a base station includes the at least one processor and the at least one non-transitory storage media; and the base station is configured to communicate in a wireless communications network.

14. The apparatus of claim 13, wherein the base station includes an eNodeB or a gNodeB.

15. A computer-implemented method, comprising:

receiving, by a distributed unit (DU) in an open radio access network from a radio unit (RU) in the open radio access network, an identifier that identifies the RU;

identifying, by the DU, communication information associated with the RU, from among a plurality of pre-stored communication information associated with a plurality of RUs, based on the identifier that identifies the RU;

determining, by the DU, a communication feature related to data transmission to the RU, from among a plurality of pre-stored communication features respectively corresponding to a plurality of carriers, using a particular carrier of the DU, the particular carrier identified based on the identified communication information; and transmitting data from the DU to the RU, using the particular carrier, in accordance with the communication information and the communication feature, wherein the identifying includes looking the identifier up in a lookup table stored in the at least one non-transitory storage media, the lookup table uniquely associating each of a plurality of RU identifiers with an interoperability (IOT) profile.

16. The method of claim 15, wherein the communication information includes the interoperability (IOT) profile; and the communication feature includes a delay window for data transmission.

17. The method of claim 15, wherein the communication information includes an extended antenna carrier identifier (eAxC_ID) that includes a DU PORT ID; and determining the communication feature includes modifying the DU PORT ID.

18. The method of claim 15, wherein identifying the communication information includes forming a beamforming profile and assigning a deployment ID to the RU; and the communication feature includes beamforming weights.

19. At least one non-transitory storage media storing instructions that, when executed by at least one processor, cause the at least one processor to perform operations comprising:

receiving, by a distributed unit (DU) in an open radio access network from a radio unit (RU) in the open radio access network, an identifier that identifies the RU;

identifying, by the DU, communication information associated with the RU, from among a plurality of pre-stored communication information associated with a plurality of RUs, based on the identifier that identifies the RU;

determining, by the DU, a communication feature related to data transmission to the RU, from among a plurality of pre-stored communication features respectively corresponding to a plurality of carriers, using a particular carrier of the DU, the particular carrier identified based on the identified communication information; and transmitting data from the DU to the RU, using the particular carrier, in accordance with the communication information and the communication feature, wherein the identifying includes looking the identifier up in a lookup table stored in the at least one non-transitory storage media, the lookup table uniquely associating each of a plurality of RU identifiers with an interoperability (IOT) profile.

\* \* \* \* \*